(12) United States Patent
Lin et al.

(10) Patent No.: US 10,292,145 B2
(45) Date of Patent: May 14, 2019

(54) SYSTEM AND METHOD FOR PARTITIONING RESOURCES FOR JOINT DECODING IN THE DOWNLINK

(71) Applicants: Yicheng Lin, Ottawa (CA); Usa Vilaipornsawai, Nepean (CA); Mohammadhadi Baligh, Ottawa (CA)

(72) Inventors: Yicheng Lin, Ottawa (CA); Usa Vilaipornsawai, Nepean (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/182,032

(22) Filed: Jun. 14, 2016

(65) Prior Publication Data

US 2017/0289964 A1    Oct. 5, 2017

Related U.S. Application Data

(60) Provisional application No. 62/316,914, filed on Apr. 1, 2016.

(51) Int. Cl.
*H04Q 7/00* (2006.01)
*H04W 72/04* (2009.01)
(Continued)

(52) U.S. Cl.
CPC .......... *H04W 72/042* (2013.01); *H04B 7/024* (2013.01); *H04B 7/0452* (2013.01);
(Continued)

(58) Field of Classification Search
CPC ............. H04W 72/042; H04W 72/046; H04W 72/0466; H04W 72/0473; H04W 72/1231;
(Continued)

(56) References Cited

U.S. PATENT DOCUMENTS

| 9,385,792 B2 | 7/2016 | Seo et al. |
| 9,935,757 B2 | 4/2018 | Chung et al. |

(Continued)

FOREIGN PATENT DOCUMENTS

| CN | 102447524 A | 5/2012 |
| CN | 102804897 A | 11/2012 |

(Continued)

OTHER PUBLICATIONS

"5G: A Technology Vision", Huawei Technologies, Co., Ltd., 2013, http://www.huawei.com/5gwhitepaper/, pp. 1-16.
(Continued)

*Primary Examiner* — Chuong T Ho

(57) ABSTRACT

Systems and methods are disclosed for partitioning resources into resource partitions, and informing user equipments (UEs) of the resource partitions. Knowledge of the resource partitions may assist the UEs in performing joint decoding. In one embodiment, a method performed by a UE includes receiving at least one message from each base station. The at least one message provides information indicating how resources are partitioned by the base station into a respective plurality of resource partitions. The information is used to identify respective resources for each of at least two downlink transmissions. Respective data that was transmitted on each of the at least two downlink transmissions using the respective resources is jointly decoded.

30 Claims, 12 Drawing Sheets

(51) Int. Cl.
*H04L 1/08* (2006.01)
*H04L 1/18* (2006.01)
*H04L 27/26* (2006.01)
*H04B 7/024* (2017.01)
*H04B 7/0452* (2017.01)
*H04B 7/06* (2006.01)
*H04L 5/00* (2006.01)
*H04W 72/12* (2009.01)
*H04W 52/34* (2009.01)

(52) U.S. Cl.
CPC ......... *H04B 7/0623* (2013.01); *H04B 7/0632* (2013.01); *H04L 1/08* (2013.01); *H04L 1/1812* (2013.01); *H04L 1/1861* (2013.01); *H04L 5/005* (2013.01); *H04L 5/0035* (2013.01); *H04L 5/0048* (2013.01); *H04L 27/2601* (2013.01); *H04W 52/34* (2013.01); *H04W 72/046* (2013.01); *H04W 72/0406* (2013.01); *H04W 72/0446* (2013.01); *H04W 72/0453* (2013.01); *H04W 72/0466* (2013.01); *H04W 72/0473* (2013.01); *H04W 72/1231* (2013.01)

(58) Field of Classification Search
CPC ......... H04W 72/0406; H04W 72/0453; H04W 72/0446; H04W 52/34; H04B 7/0632; H04B 7/0452; H04B 7/024; H04B 7/0623; H04L 5/0035; H04L 1/08; H04L 5/0048; H04L 27/2601; H04L 1/1861; H04L 1/1812; H04L 5/005
USPC .................................................. 370/329, 330
See application file for complete search history.

(56) References Cited

U.S. PATENT DOCUMENTS

| | | |
|---|---|---|
| 2007/0265016 A1 | 11/2007 | Kahtava et al. |
| 2010/0034310 A1 | 2/2010 | Nam et al. |
| 2010/0195594 A1 | 8/2010 | Seo et al. |
| 2010/0273492 A1 | 10/2010 | Liu et al. |
| 2010/0275083 A1* | 10/2010 | Nam .................. H03M 13/6306 714/748 |
| 2010/0278034 A9* | 11/2010 | Laroia ..................... H04L 5/023 370/209 |
| 2011/0085503 A1 | 4/2011 | Nam et al. |
| 2011/0103324 A1 | 5/2011 | Nam et al. |
| 2011/0110219 A1 | 5/2011 | Nam et al. |
| 2011/0110449 A1* | 5/2011 | Ramprashad ......... H04L 1/0003 375/261 |
| 2011/0199985 A1 | 8/2011 | Cai et al. |
| 2011/0243012 A1* | 10/2011 | Luo ....................... H04L 5/0055 370/252 |
| 2011/0268176 A1 | 11/2011 | Jeong et al. |
| 2012/0034927 A1* | 2/2012 | Papasakellariou .... H04L 1/1861 455/450 |
| 2012/0057523 A1* | 3/2012 | Ji .......................... H04B 7/155 370/315 |
| 2012/0082101 A1* | 4/2012 | Gaal .................. H04W 72/1226 370/329 |
| 2012/0106442 A1 | 5/2012 | Xiao |
| 2013/0039162 A1 | 2/2013 | Zhang et al. |
| 2013/0128832 A1 | 5/2013 | Kang et al. |
| 2013/0195000 A1* | 8/2013 | Shen .................... H04B 7/024 370/312 |
| 2013/0231122 A1* | 9/2013 | Vrzic ................ H04W 72/0406 455/450 |
| 2013/0251058 A1 | 9/2013 | Wu et al. |
| 2013/0315337 A1 | 11/2013 | Dai et al. |
| 2013/0322376 A1 | 12/2013 | Marinier et al. |
| 2013/0329823 A1 | 12/2013 | Khojastepour |
| 2014/0126484 A1* | 5/2014 | Chen .................... H04L 5/0055 370/329 |
| 2014/0161071 A1* | 6/2014 | Nam .................. H03M 13/6306 370/329 |
| 2014/0169408 A1 | 6/2014 | Bayesteh et al. |
| 2014/0192734 A1 | 7/2014 | Ng et al. |
| 2014/0369434 A1 | 12/2014 | Taherzadehboroujeni et al. |
| 2015/0244439 A1 | 8/2015 | Nam et al. |
| 2015/0289257 A1* | 10/2015 | Luo ....................... H04L 5/0055 370/329 |
| 2015/0295695 A1* | 10/2015 | Davydov .............. H04W 72/12 370/329 |
| 2015/0312074 A1 | 10/2015 | Zhu et al. |
| 2015/0327274 A1 | 11/2015 | Lim et al. |
| 2016/0028527 A1 | 1/2016 | Nam et al. |
| 2016/0028528 A1 | 1/2016 | Nam et al. |
| 2016/0036504 A1* | 2/2016 | Khojastepour ........ H04B 7/024 370/280 |
| 2016/0080058 A1 | 3/2016 | Kang et al. |
| 2016/0087694 A1 | 3/2016 | Vilaipornsawai et al. |
| 2016/0234820 A1* | 8/2016 | Mallik ............. H04W 72/0406 |
| 2016/0286549 A1 | 9/2016 | Abraham et al. |
| 2017/0141886 A1 | 5/2017 | Chung et al. |
| 2017/0163333 A1* | 6/2017 | Breiling ............. H04B 7/15592 |
| 2017/0171786 A1 | 6/2017 | Mochizuki et al. |
| 2017/0202025 A1 | 7/2017 | Ouchi et al. |
| 2017/0289984 A1 | 10/2017 | Baligh et al. |
| 2017/0290046 A1* | 10/2017 | Sun .................... H04L 25/0202 |
| 2017/0359827 A1 | 12/2017 | Kim et al. |
| 2018/0041988 A1 | 2/2018 | Lee et al. |
| 2018/0159669 A1 | 6/2018 | Chung et al. |
| 2018/0316371 A1* | 11/2018 | Davydov .............. H04W 72/12 |

FOREIGN PATENT DOCUMENTS

| | | |
|---|---|---|
| CN | 102918788 A | 2/2013 |
| CN | 103503326 A | 1/2014 |
| EP | 3297377 A1 | 3/2018 |

OTHER PUBLICATIONS

Furukawa, Hiroshi et al., "SSDT—Site Selection Diversity Transmission Power Control for CDMA Forward Link", IEEE Journal on Selected Areas in Communications, vol. 18. No. 8, Aug. 2000, pp. 1546-1554.

Gesbert, David et al., "Multi-Cell MIMO Cooperative Networks: A New Look at Interference", IEEE Journal on Selected Areas in Communications, vol. 28, No. 9, Dec. 2010, pp. 1-29.

Chae, Chan-Byoung et al., "Coordinated Beamforming with Limited Feedback in the MIMO Broadcast Channel", IEEE Journal on Selected Areas in Communications, vol. 26, No. 8, Oct. 2008, pp. 1505-1515.

Hoshyar, Reza et al., "Novel Low-Density Signature for Synchronous CDMA Systems Over AWGN Channel", IEEE Transactions on Signal Processing, vol. 56, No. 4, Apr. 2008, pp. 1616-1626.

Nikopour, Hosein et al., "Sparse Code Multiple Access", IEEE 24th International Symposium on Personal, Indoor and Mobile Radio Communications: Fundamentals and PHY Track, Sep. 2013, pp. 332-336.

Van De Beek, Jaap et al. "Multiple Access with Low-Density Signatures", Global Telecommunications Conference, IEEE GLOBECOM, Nov. 2009, pp. 1-6.

Zhang, Shunqing et al., "Sparse Code Multiple Access: An Energy Efficient Uplink Approach for 5G Wireless Systems", Gobal Communications Conference, IEEE GLOBECOM 2014—Wireless Networking Symposium, Dec. 2014, pp. 4782-4787.

Au, Kelvin et al., "Uplink Contention Based SCMA for 5G Radio Access", Proc. IEEE GLOBECOM 2014, Dec. 2014, pp. 1-6.

3GPP TR 36.814 V9.0.0, 3rd Generation Partnership Project; Technical Specification Group Radio Access Network; Evolved Universal Terrestrial Radio Access (E-UTRA); Further advancements for E-UTRA physical layer aspects (Release 9), 3GPP, Apr. 2013, pp. 1-104.

Taherzadeh, Mahmoud et al., "SCMA Codebook Design", IEEE VTC Fall, Sep. 2014, pp. 1-5.

(56) References Cited

OTHER PUBLICATIONS

Zarifi, Keyvan et al,. "Radio Access Virtualization: Cell follows User", IEEE 25th International Symposium on Personal, Indoor and Mobile Radio Communications, Sep. 2014, pp. 1381-1385.

"The Second Phase of LTE-Advanced, LTE-B: 30-fold Capacity Boosting to LTE", Huawei Technologies, Co., Ltd., 2013, http://www.huawei.com/en/industry-insights/huawei-voices/white-papers/hw_259010, pp. 1-20.

Agrawal, Rajeev et al., "Dynamic Point Selection for LTE-Advanced: Algorithms and Performance", IEEE WCNC'14 Track 2 (MAC and Cross-Layer Design), 2014, pp. 1-6.

Karakayali, M. Kemal et al., "Network Coordination for Spectrally Efficient Communications in Cellular Systems", IEEE Transactions on Wireless Communications, vol. 13, No. 4, Aug. 2006, pp. 56-61.

Dahrouj, Hayssam et al., "Coordinated Beamforming for the Multicell Multi-Antenna Wireless System", IEEE Transactions on Wireless Communications, vol. 9, No. 5, May 2010, pp. 1748-1759.

Nikopour, Hosein et al., "SCMA for Downlink Multiple Access of 5G Wireless Networks", IEEE GLOBECOM 2014, pp. 3940-3945.

Usa Vilaipomsawai et al.,"SCMA for Open-Loop Joint Transmission CoMP", Computer Science, dated Apr. 7, 2015, total 5 pages.

Malte Schellmann,"Mobile and wireless communications Enablers for the Twenty-twenty Information Society (Metis)"—Proposed solutions for new radio access Deliverable D2.4,Document Number: ICT-317669-METIS/D2.4, dated Feb. 28, 2015, total 190 pages.

\* cited by examiner

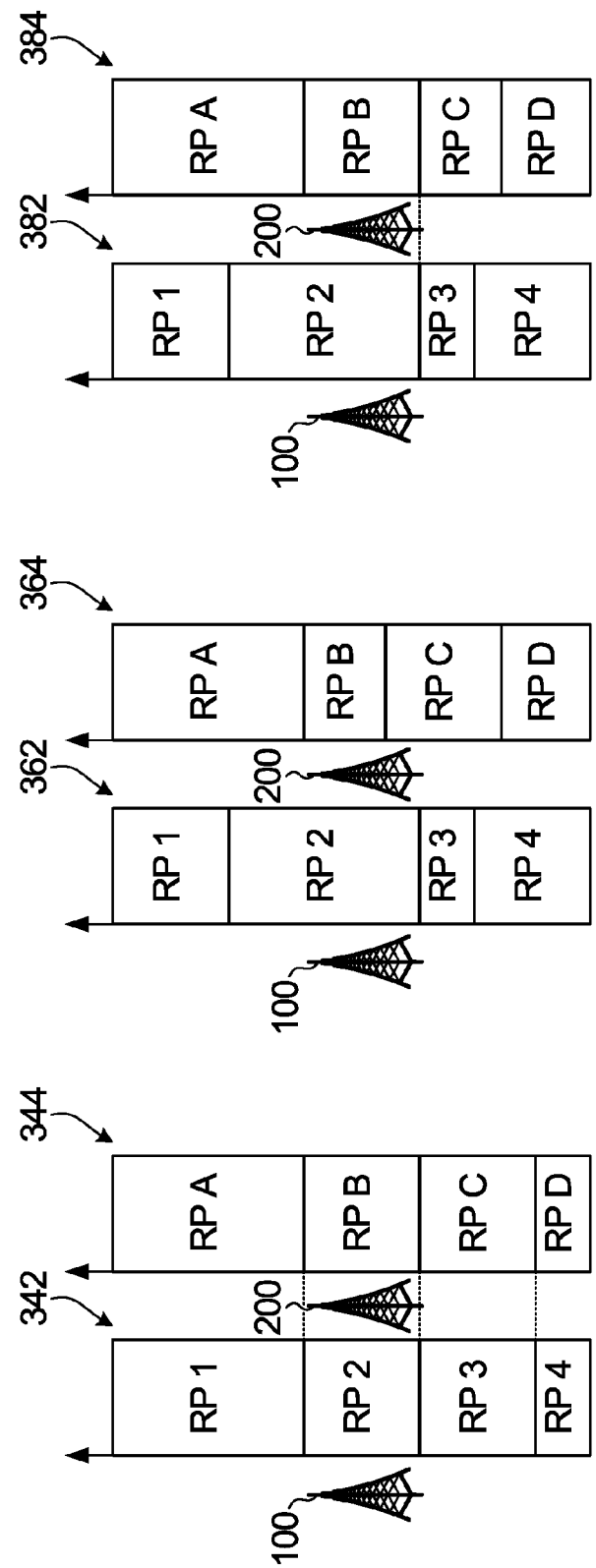

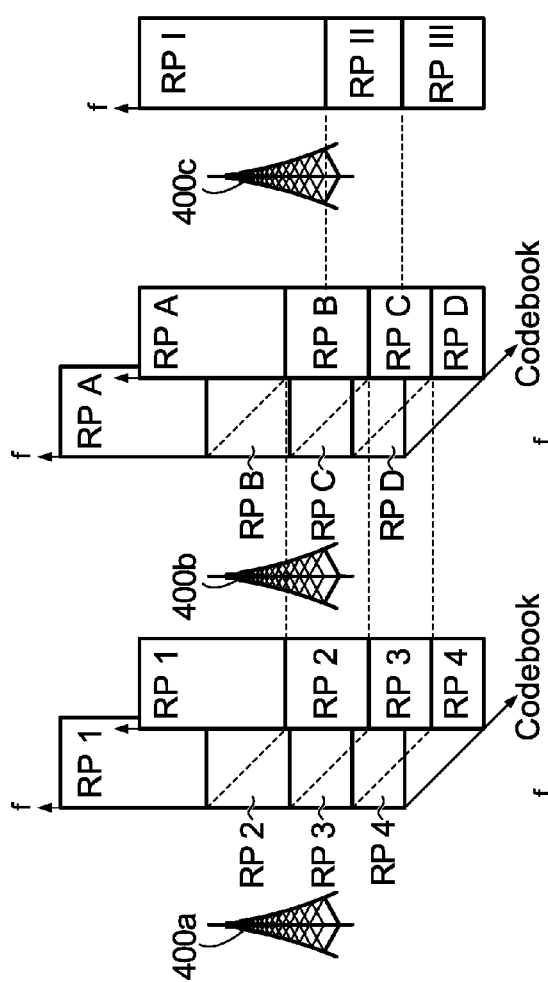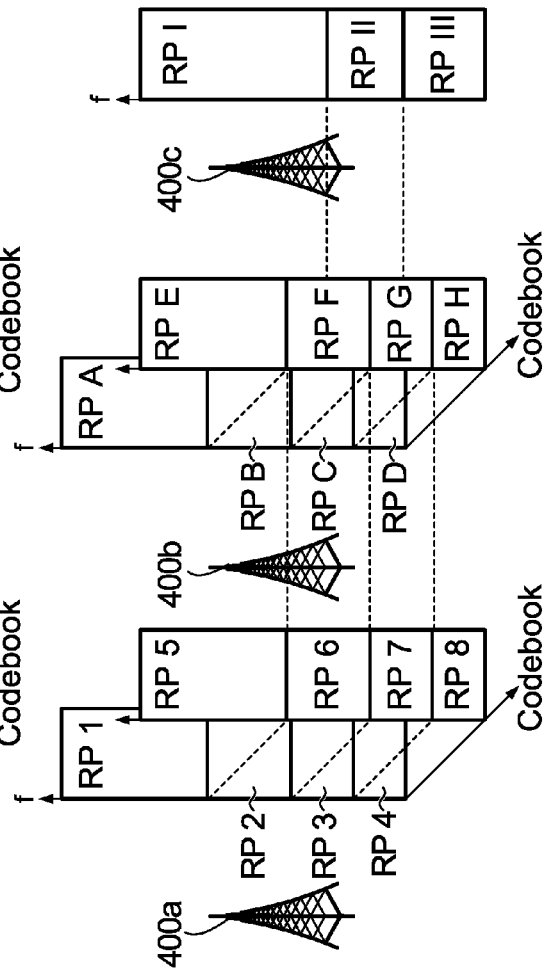

SYSTEM AND METHOD FOR PARTITIONING RESOURCES FOR JOINT DECODING IN THE DOWNLINK

CROSS-REFERENCE TO RELATED APPLICATION

This application claims the benefit of U.S. Provisional Patent Application Ser. No. 62/316,914 filed on Apr. 1, 2016, the entire content of which is incorporated herein by reference.

FIELD

The present application relates to partitioning resources and joint decoding.

BACKGROUND

In some wireless communication systems, a user equipment (UE) wirelessly communicates with a base station to send data to the base station and/or receive data from the base station. For example, cell phones may communicate with a cell phone tower to make and receive phone calls. In this example, the cell phone tower would be the base station, and each cell phone would be a UE.

A wireless communication from a UE to a base station is referred to as an uplink communication, and a wireless communication from a base station to a UE is referred to as a downlink communication.

Resources are required to make uplink and downlink communications. For example, a base station may wirelessly transmit data to a particular UE in a downlink transmission at a particular frequency and/or during a particular slot in time. The frequency and time slot used are examples of resources.

When a base station is making a downlink transmission to a UE using particular resources, another downlink transmission from a neighbouring base station, or even from the same base station, may also use those same resources. This other downlink transmission may interfere with the data transmission from the base station to the UE.

SUMMARY

Systems and methods are disclosed for partitioning resources into resource partitions, and informing UEs of the resource partitions, which may assist the UEs in performing joint decoding.

In one embodiment, a method performed at a base station is disclosed. The method may include transmitting at least one message for at least one UE. The at least one UE is to jointly decode respective data in each of at least two downlink transmissions. The at least one message may provide information indicating how resources are partitioned by the base station into a plurality of resource partitions. The method may further include, for each resource partition of the plurality of resource partitions: transmitting data for a UE using a plurality of resources of the resource partition.

In another embodiment, a base station is disclosed. The base station may include a joint decoding facilitator configured to generate at least one message for at least one UE. The at least one UE is to jointly decode respective data in each of at least two downlink transmissions. The at least one message may provide information indicating how resources are partitioned by the base station into a plurality of resource partitions. The base station may be configured to: transmit the message, and for each resource partition of the plurality of resource partitions: transmit data for a UE using a plurality of resources of the resource partition.

In another embodiment, a method performed by a UE is disclosed. The method may include receiving at least one message from each base station of at least one base station. The at least one message from each base station may provide information indicating how resources are partitioned by the base station into a respective plurality of resource partitions. The method may further include utilizing the information to identify respective resources for each of at least two downlink transmissions. The method may further include jointly decoding respective data that was transmitted on each of the at least two downlink transmissions using the respective resources, to obtain jointly decoded data.

In another embodiment, a UE is disclosed. The UE may include at least one antenna configured to receive at least one message from each base station of at least one base station. The at least one message from each base station may provide information indicating how resources are partitioned by the base station into a respective plurality of resource partitions. The UE may further include a joint decoder configured to obtain jointly decoded data by: utilizing the information to identify respective resources for each of at least two downlink transmissions; and jointly decoding respective data that was transmitted on each of the at least two downlink transmissions using the respective resources.

Other aspects and features will become apparent to those of ordinary skill in the art upon review of the following description.

BRIEF DESCRIPTION OF THE DRAWINGS

Embodiments will be described, by way of example only, with reference to the accompanying figures wherein:

FIG. 8 illustrates coordination between resource partition boundaries of two base stations, according to one embodiment;

FIG. 9 illustrates no coordination between resource partition boundaries of two base stations, according to one embodiment;

FIG. 10 illustrates some coordination between resource partition boundaries of two base stations, according to one embodiment;

FIGS. 12 to 15 each illustrate an example of a tier 1 transmission of two base stations and a tier 2 transmission of a third base station;

DETAILED DESCRIPTION

For illustrative purposes, specific example embodiments will now be explained in greater detail below in conjunction with the figures.

Figure 1:
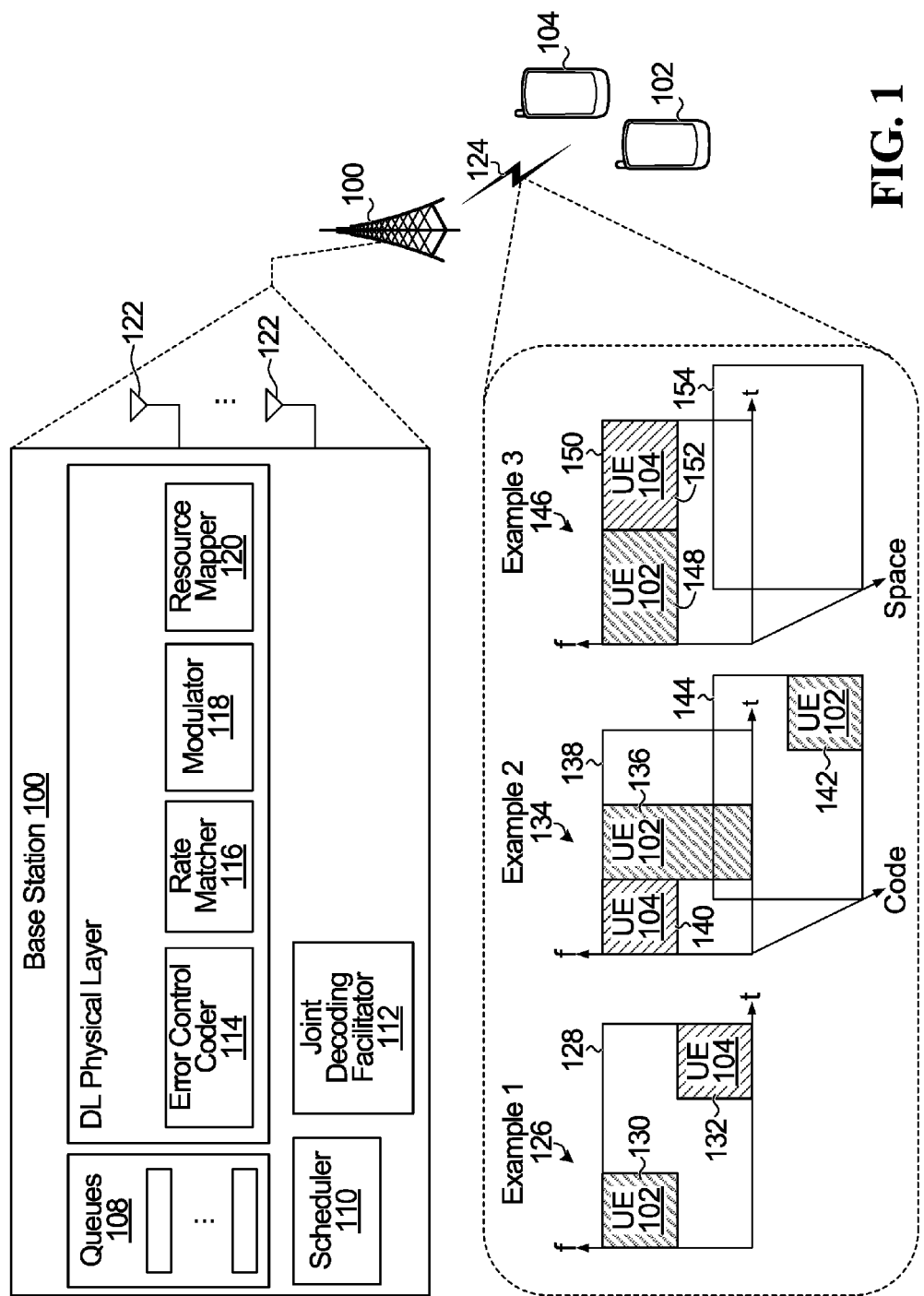
FIG. 1 is a block diagram of a base station and two UEs, according to one embodiment.

FIG. 1 is a block diagram of a base station 100, as well as two UEs 102 and 104, according to one embodiment. The base station 100 includes queues 108 for storing data to be sent to UEs served by the base station 100. The queues 108 may be implemented by memory, e.g., physical registers. The base station 100 further includes a scheduler 110 for scheduling UEs on available resources. The scheduler 110 may be implemented by a processor that executes instructions that cause the processor to perform the operations of the scheduler 110. Alternatively, the scheduler 110 may be implemented using dedicated integrated circuitry, such as an application specific integrated circuit (ASIC), a graphics processing unit (GPU), or a programmed field programmable gate array (FPGA) for performing the functions of the scheduler 110.

The base station 100 further includes a joint decoding facilitator 112 for performing operations that may facilitate joint decoding by UEs, such as UEs 102 and 104. The joint decoding facilitator 112 may be implemented by a processor that executes instructions that cause the processor to perform the operations of the joint decoding facilitator 112. Alternatively, the joint decoding facilitator 112 may be implemented using dedicated integrated circuitry, such as an ASIC, a GPU, or a FPGA.

The base station 100 further includes modules for implementing the downlink physical layer, such as an error control coder 114, a rate matcher 116, a modulator 118, and a resource mapper 120. The error control coder 114, rate matcher 116, modulator 118, and resource mapper 120 may each be implemented by a processor that executes instructions that cause the processor to perform the operations of the error control coder 114, rate matcher 116, modulator 118, and resource mapper 120. The same or different processor may be used to implement each of the modules. Alternatively, the error control coder 114, rate matcher 116, modulator 118, and/or resource mapper 120 may be implemented using dedicated integrated circuitry, such as an ASIC, GPU, or FPGA.

The base station 100 further includes one or more antennas 122 to wirelessly transmit signals carrying data for UEs, such as UEs 102 and 104. The base station 100 may include other circuitry and/or modules for performing other functions, but these have been omitted for the sake of clarity.

The word "base station" encompasses any device that wirelessly transmits data in the downlink to UEs. Therefore, in some implementations, the base station 100 may be called other names, such as a transmit point, a base transceiver station, a radio base station, a network node, a transmit node, a Node B, an eNode B, a relay station, or a remote radio head (RRH). Also, in some embodiments, some of the components of the base station 100 described above may not actually physically reside in the base station 100, but may be located remote from the base station 100 and coupled to the base station 100 over a communication link.

The UEs 102 and 104 are both served by the base station 100. When the base station 100 has data to transmit to UEs 102 and 104, the base station 100 transmits this data in one or more downlink transmissions 124. Resources are allocated to the UEs 102 and 104 by the base station 100 to transmit the data to the UEs 102 and 104. Examples of resources that may be allocated to the UEs 102 and 104 include time, frequency, code, and/or spatial resources.

Three specific examples of resource allocation are illustrated in FIG. 1. In the first example 126, the base station 100 transmits data in the downlink to UEs using orthogonal frequency-division multiple access (OFDMA). The base station 100 uses frames of time-frequency resources to transmit data in the downlink. Example 126 illustrates one frame 128 of time-frequency resources. The vertical axis of the frame 128 represents frequency, and the horizontal axis represents time. The resources are partitioned into resource partitions. UE 102 is scheduled on resource partition 130, which is a partition of the time-frequency resources in the frame 128. UE 104 is scheduled on another resource partition 132, which is also a partition of time-frequency resources. A resource partition may sometimes be called a resource group, transmit group, resource block, or transmit block. The location and size of each resource partition 130 and 132 is determined by the base station 100, and the location and size of the resource partitions 130 and 132 may change over time. Also, in some frames a particular UE may be scheduled on multiple resource partitions, and in other frames may not be scheduled at all.

A second example is shown at 134. In addition to time-frequency resources, the base station 100 uses code resources to allow multiple time-frequency frames to be transmitted using the same time-frequency resources. The multiple time-frequency frames are distinguished from each other using different codebooks. An example is sparse code multiple access (SCMA), which is described in H. Nikopour and H. Baligh, "Sparse code multiple access," in *IEEE 24th PIMRC*, London, UK, 2013, pp. 332-336, and H. Nikopour, E. Yi, A. Bayesteh, K. Au, M. Hawryluck, and J. Ma, "SCMA for downlink multiple access of 5G wireless networks," in *IEEE Global Telecomun. Conf.*, Austin, Tex., 2014. In this second example 134, the UE 102 is scheduled on a first resource partition 136, which consists of a first group of time-frequency resources in a first time-frequency frame 138. UE 104 is scheduled on a second resource partition 140, which consists of a second group of time-frequency resources in the first time-frequency frame 138. UE 102 is also scheduled on a third resource partition 142, which is a group of time-frequency resource in a second time-frequency frame 144. Although the first time-frequency frame 138 and the second time-frequency frame 144 share time-frequency resources, transmissions on the first time-frequency frame 138 and the second time-frequency frame 144 may be distinguished from each other in the decoding process in the UEs 102 and 104 because the first time-frequency frame 138 and the second time-frequency frame 144 are transmitted in different code-domain layers.

A third example is shown at 146. In addition to time-frequency resources, the base station 100 uses spatial resources to allow multiple time-frequency frames to be transmitted over the same time-frequency resources, but separated from each other in space using beamforming. The UE 102 is scheduled on a first resource partition 148, which is a group of time-frequency resources on a first time-frequency frame 150. UE 104 is scheduled on a second resource partition 152, which is a group of time-frequency resources on the first time-frequency frame 150. The base station 100 uses beamforming to transmit another time-frequency frame 154 in a different direction in space to send data to other UEs using other resource partitions.

The base station 100 may use a combination of time, frequency, spatial, and code resources, which are then partitioned into resource partitions. Also, the resource partitions 130, 132, 136, 140, 142, 148, and 152 in the examples are each square or rectangular blocks in the time-frequency domain. This corresponds to a logical partitioning of the time-frequency domain. When the time-frequency frame is actually transmitted in the downlink, the resources assigned to each resource partition may be distributed throughout a time-frequency frame.

In operation, data that is to be transmitted from the base station 100 to UEs is stored in the queues 108. For a particular downlink transmission, the scheduler 110 assigns available resources to respective UEs being served by the base station 100. For example, in frame 128 of example 126, resource partition 130 is assigned by the scheduler 110 to UE 102, and resource partition 132 is assigned by the scheduler 110 to UE 104. Other resource partitions are assigned to other UEs (not shown) that are served by the base station 100. The scheduler 110 uses a scheduling algorithm to decide which UE should be assigned to which resources. An example of a scheduling algorithm that may be used by the scheduler 110 is a proportionally fair (PF) scheduling algorithm. The scheduler 110 may grant resource partitions of different sizes to different UEs.

In the example 126, resource partition 130 is assigned to UE 102. The actual number of bits that can be transmitted to UE 102 in the downlink transmission depends on the size of the resource partition 130, i.e., how many time-frequency locations (OFDM subcarriers) are in the resource partition 130. Each time-frequency location is sometimes called a resource element. The actual number of bits that can be transmitted to UE 102 in the downlink also depends upon the modulation and coding scheme (MCS) for the UE 102. If the wireless channel between the base station 100 and the UE 102 is of low quality, then a low MCS value may be used, e.g. an MCS value corresponding to binary phase shift keying (BPSK) modulation with an error control code rate of 1/3. Alternatively, if the wireless channel between the base station 100 and the UE 102 is of high quality, then a higher MCS value may be used, e.g. an MCS value corresponding to 16-quadrature amplitude modulation (16-QAM) with an error control code rate closer to one. The higher the MCS value, the more bits that can be transmitted in the resource partition 130.

Based on the size of the resource partition 130 and the MCS for UE 102, an appropriate number of bits to be transmitted to UE 102 are removed from the queue 108 and sent to the downlink physical layer. The error control coder 114 encodes the bits using an error control code to result in coded bits. One example of an error control code that may be applied by the error control coder 114 is a turbo code. Other error control codes may be used, such as block codes or other convolutional codes.

The coded bits output from the error control coder 114 are subject to rate matching in rate matcher 116. The rate matcher 116 performs puncturing of the coded bit stream or adds repetition to the coded bit stream, as needed, to match the rate of the coded bits to that required by the MCS for the UE 102. The rate matcher 116 also determines which of the coded bits are to be transmitted on which resources in the resource partition 130. The modulator 118 modulates the coded bits to generate modulated symbols. The coded bits are modulated using the modulation scheme required by the MCS for the UE 102. For example, as mentioned above, if the MCS value for the UE 102 is low, then the modulator 118 may perform BPSK, and if the MCS value for the UE 102 is higher, then the modulator 118 may perform 16-QAM modulation. The resource mapper 120 maps the modulated symbols to the resources assigned to UE 102, i.e., the time-frequency resources in resource partition 130 in the example shown at 126. Each modulated symbol is transmitted on a respective time-frequency resource in the resource partition 130. There may be other modules in the downlink physical layer, e.g. scrambling, which have been omitted for clarity.

Similar operation would occur in the base station 100 for UE 104, as well as the other UEs scheduled on the available resources for the downlink transmission. The generated downlink signal is transmitted from the base station 100 to the UEs using the one or more antennas 122.

In some embodiments, hybrid automatic repeat request (HARQ) may be supported. In HARQ, if initial data is corrupted during a downlink transmission with errors that are not correctable by a UE, such that the initial data is unsuccessfully decoded, then that UE may request a HARQ retransmission, which may include a retransmission of the initial data and/or further information for decoding the initial data. For example, the base station 100 may transmit data to UE 102 using the resource partition 130 shown in example 126. The data transmitted using the resource partition 130 is encoded using an error control code applied by the error control coder 114. If the data as received by the UE 102 is corrupted with errors that cannot be corrected by the error control code, then the UE 102 may indicate this to base station 100 via an uplink transmission. The base station 100 may then transmit retransmission data, which may include some or all of the original data and/or parity information. The retransmission data is transmitted using resources in a downlink transmission at a later time. A HARQ process ID, sometimes called a HARQ ID, may be used to identify a HARQ retransmission that corresponds to an initial unsuccessfully decoded transmission. The UE 102 may perform HARQ combining, that is, instead of discarding unsuccessfully decoded initial data, the unsuccessfully decoded initial data may be stored at the UE 102 and combined with the retransmission data to try to successfully decode the initial data. When HARQ combining is performed, the retransmission data from the base station 100 may not need to be a complete retransmission of the initial data. The retransmission may carry less data, such as some or all of the parity bits associated with the initial data.

If the base station 100 downlink transmissions are in accordance with the long term evolution (LTE) standard, then the error control coder 114 is a turbo encoder that generates a mother code having a rate of 1/3. The output of the turbo coder is three bit streams: a systematic bit stream and two parity bit streams. The rate matcher 116 then performs puncturing on the bits output by the turbo encoder or adds repetition to the bits output by the turbo coder to change the rate of the code so that the code rate matches that required by the MCS. The rate matcher 116 includes a circular buffer (not illustrated) that stores the systematic and parity bits output by the turbo coder. The bits are read from the circular buffer and modulated using the modulator 118. The circular buffer in the rate matcher 116 has four redundancy versions (RVs) associated with the circular buffer: RV0, RV1, RV2, and RV3. Each RV indicates a starting location from which the coded bits are to be read from the circular buffer. Data may initially be transmitted using RV 0, but if the data as received by the UE 102 is corrupted with errors that cannot be corrected, then the HARQ retransmission may use a higher RV, e.g., RV 1 for the first retransmission, RV 2 for a second retransmission, and RV 3 for a third retransmission. The rate mapper 116 determining the RV for the transmission of the coded data is an example of the rate mapper 116 determining which of the coded bits are to be transmitted on which resources in the resource partition 130. The UE 102 uses knowledge of the RV to decode.

Figure 2:
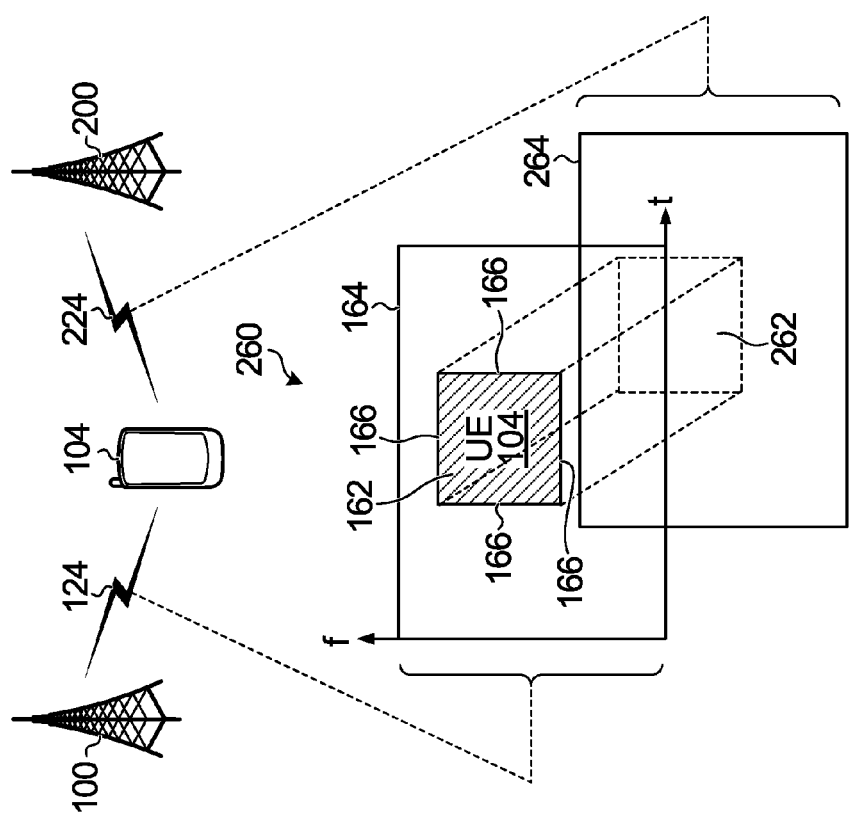
FIG. 2 illustrates the base station and a UE from FIG. 1, along with a neighbouring base station, according to one embodiment.

FIG. 2 illustrates the base station 100 and UE 104 from FIG. 1, along with a neighbouring base station 200, according to one embodiment. In operation, the UE 104 is served by the base station 100 and receives data via the downlink transmission 124. However, UE 104 is also in the vicinity of the neighbouring base station 200. The UE 104 may or may not be served by the neighbouring base station 200 also, but in any case the neighbouring base station 200 also makes a downlink transmission 224. The resources used by the neighbouring base station 200 in its downlink transmission 224 are the same as the resources used by the base station 100 in its downlink transmission 124. A specific example is shown at 260. UE 104 is scheduled on a resource partition 162 comprising a group of resources in a time-frequency frame 164 transmitted by base station 100. The resource partition 162 has boundaries 166 in the time-frequency domain which define the resource partition 162, i.e. the boundaries 166 specify and limit the time-frequency resources allocated to transmitting data to the UE 104. The neighbouring base station 200 also transmits a time-frequency frame 264. The time-frequency frame 264 includes time-frequency resources 262 that are the same as those in the resource partition 162 in time-frequency frame 164.

When the UE 104 decodes the data that was transmitted by the base station 100 using the resource partition 162, in general the UE 104 may treat the transmission from base station 200 on resources 262 as noise. However, if instead the UE 104 was able to jointly decode both the data sent from base station 100 on the resource partition 162 and the data sent from base station 200 on the resources 262, then performance may be improved.

The UE 104 may be able to perform joint decoding more effectively if the resource partitions used for the downlink transmissions 124 and 224 are known to the UE 104. The UE 104 may be aware of resource partition 162, but unless informed by the base stations 100 and 200, in general the UE 104 would not know how the other resources are partitioned into other resource partitions for other UEs. The information indicating how resources are partitioned by each of base station 100 and 200 into a respective plurality of resource partitions may facilitate joint decoding by the UE 104 for the following reason: data transmitted on each resource partition is coded with an error control code, and therefore joint decoding may be more effective if all of the data transmitted using a particular resource partition is jointly decoded with all data in overlapping resource partitions in other downlink transmissions. For example, having knowledge of the boundaries of the resource partitions allows the UE 104 to identify a set of coterminous resource partition sets, each resource partition set corresponding to a respective downlink transmission and including at least one resource partition of that downlink transmission. Identifying the coterminous resource partition sets and jointly decoding respective data from each downlink transmission using the coterminous resource partition sets may make joint decoding more effective.

Figure 3:
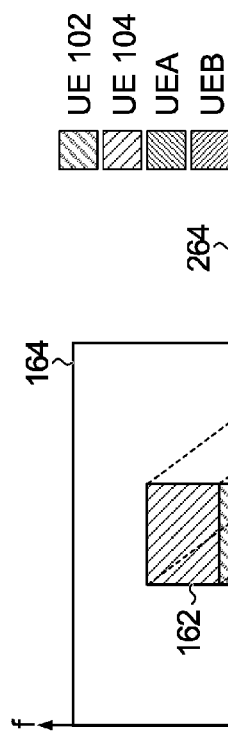
FIGS. 3 to 5 respectively illustrate an example of resource partitions in the time-frequency domain.
Figure 4:
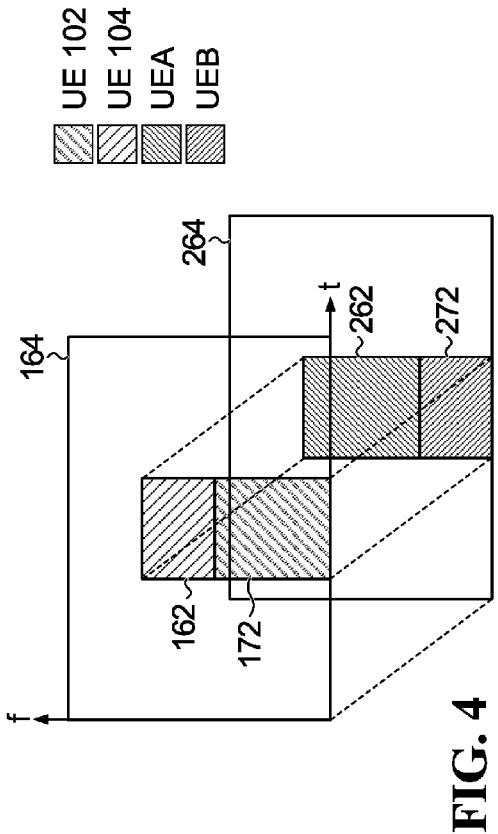
Figure 5:
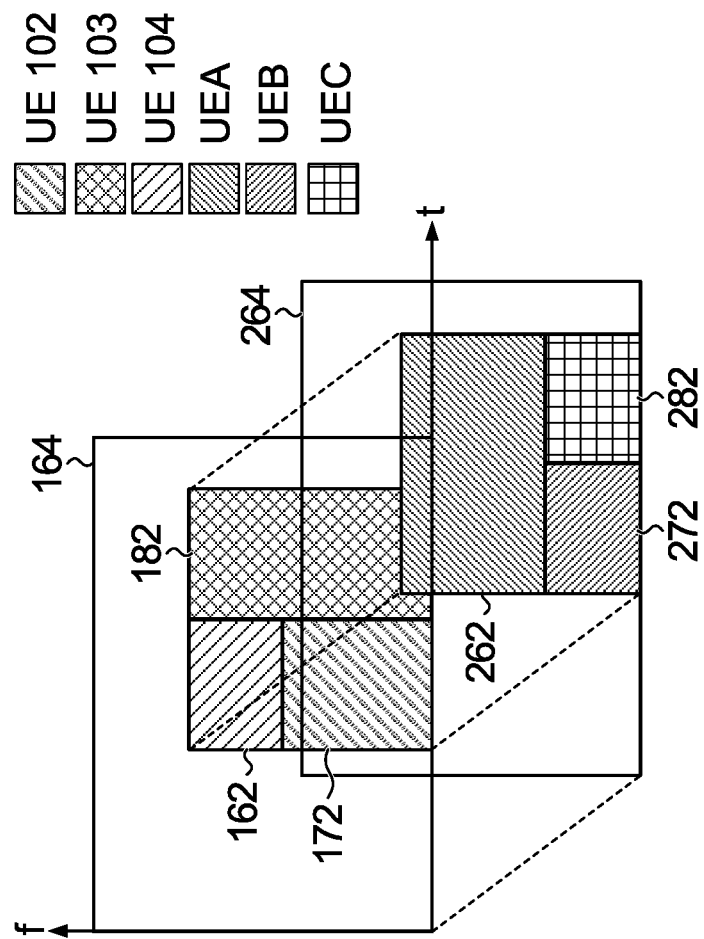

FIGS. 3 to 5 respectively illustrate an example of resource partitions in the time-frequency domain for time-frequency frames 164 and 264.

In FIG. 3, UE 104 is scheduled on resource partition 162 in frame 164, and UE 102 is scheduled on resource partition 172 in frame 164. Another UE, called "UE A", which is being served by base station 200 is scheduled on resource partition 262 in frame 264. Another UE, called "UE B", which is also being served by base station 200 is scheduled on resource partition 272 in frame 264. Resource partitions 162 and 262 in FIG. 3 are coterminous, i.e., the resources in resource partition 162 are coterminous with the resources in resource partition 172. That is, the boundaries of resource partition 262 match the boundaries of resource partition 162. The data sent over resource partition 262 and the data sent over resource partition 162 may be jointly decoded by UE 104.

In FIG. 4, UE 104 is scheduled on resource partition 162 in frame 164, and UE 102 is scheduled on resource partition 172 in frame 164. UE A is scheduled on resource partition 262 in frame 264, and UE B is scheduled on resource partition 272 in frame 264. Unlike in FIG. 3, the resource partitions 162 and 262 in FIG. 4 are not coterminous, as can be seen from comparing the stippled lines in FIG. 3 to the stippled lines in FIG. 4. Instead, in FIG. 4, resource partition 262 overlaps with resource partition 172. However, in FIG. 4, a resource partition set consisting of resource partitions 162 and 172 is coterminous with a respective resource partition set consisting of resource partitions 262 and 272. That is, in FIG. 4, the set of resource partitions 162 and 172 has the same partition boundary as the set of resource partitions 262 and 272. The data sent over resource partitions 262, 272 162 and 172 may be jointly decoded by UE 104. To perform the joint decoding, the UE 104 identifies respective resources from each of frames 164 and 264 that are coterminous by identifying a first resource partition set in frame 164, having resource partitions 162 and 172, and a second resource partition set in frame 264, having resource partitions 262 and 272. The data in the coterminous resource partition sets are then jointly decoded by UE 104.

In FIG. 5, UE 104 is scheduled on resource partition 162, UE 102 is scheduled on resource partition 172, and another UE 103 is scheduled on resource partition 182. UE A is scheduled on resource partition 262, UE B is scheduled on resource partition 272, and another UE C is scheduled on resource partition 282. Resource partition 162 is not coterminous with another resource partition in frame 264. Instead, a resource partition set consisting of resource partitions 162, 172, and 182 is coterminous with a respective resource partition set consisting of resource partitions 262, 272, and 282. The data sent over the coterminous resource partitions sets may be jointly decoded by UE 104.

In the embodiments explained in relation to FIGS. 2 to 5, the downlink transmissions 124 and 224 (shown in FIG. 2) come from two different base stations. Alternatively, the two downlink transmissions 124 and 224 may come from the same base station. Also, in some embodiments there may be more than two downlink transmissions each carrying respective data that may be jointly decoded, and the multiple downlink transmissions may come from any number of base stations. Also, the UE 104 does not necessarily have to use the knowledge of the resource partitions in the downlink transmissions to identify coterminous resources to jointly decode. For example, with reference to FIG. 4, the UE 104 may decide to jointly decode the data sent on resource partition 162 and data sent on resource partition 262, rather than jointly decode all of the data on the coterminous resources making up resource partitions 162, 172, 262, and 272. To perform the joint decoding, the UE 104 uses its knowledge of the boundaries of the resource partitions to jointly decode resource partitions 162 and 262 that are not coterminous. Jointly decoding data on respective resources that are not coterminous may add more complexity to the joint decoding, but it may be desirable for the UE 104 in certain scenarios, e.g. if the MCS of the data transmitted using resource partition 272 is not conducive to joint decoding.

In some embodiments, other information may additionally be used by the UE 104 to perform joint decoding more effectively. For example, the UE 104 may also know the MCS associated with each resource partition, and the knowledge of the MCS may assist in more effective joint decoding. The MCS associated with each resource partition may be signalled from the base stations 100 and 200 to the UEs. As another example, the UE 104 may also or instead know how the coded bits of data transmitted in each resource partition were mapped to the resources in the resource partition, e.g. the rate information, such as the RV of transmitted data in an LTE-specific implementation. Rate matching information, such as the RV, may be transmitted from the base stations 100 and 200 to the UEs.

Returning to FIG. 1, the base station 100 includes joint decoding facilitator 112, which determines information at the base station 100 that may assist UEs in joint decoding, and then generates at least one message that, when transmitted by the base station 100, provides the information to the UEs in the vicinity of the base station 100. As one example, the joint decoding facilitator 112 may partition certain resources into predetermined resource partitions and form a message indicating the resource partitions. This message may be transmitted to the UEs and also provided to the scheduler 110. In some embodiments, the joint decoding facilitator 112 may determine that all data transmitted on the predetermined resource partitions will use a predetermined MCS. In some embodiments, the joint decoding facilitator 112 may determine that all data transmitted on the resource partitions must be mapped to resources in the predetermined resource partitions in the same manner, e.g. using RV 0. This information may be encapsulated in at least one messages generated by the joint decoding facilitator 112. The at least one message may then be transmitted by the base station 100. The UEs may use this information to perform joint decoding of respective data transmitted in respective downlink transmissions.

Figure 6:
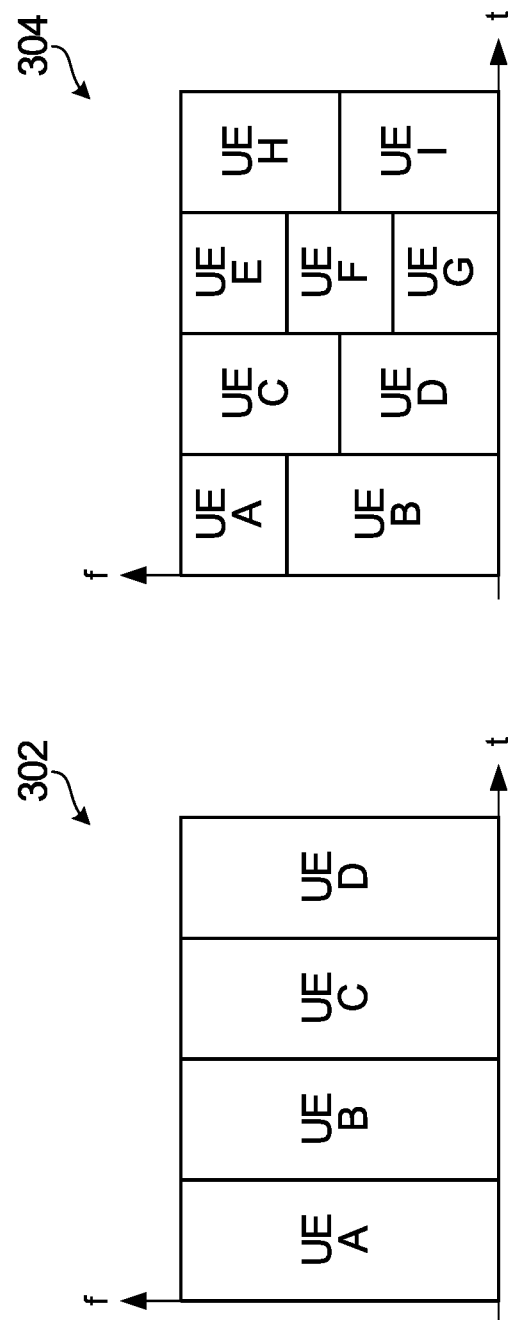
FIGS. 6 and 7 each illustrate two frames of time-frequency resources, according to one embodiment.

FIG. 6 illustrates two frames 302 and 304 of time-frequency resources, according to one embodiment. A logical partitioning of the resources is illustrated. In frame 302, respective data is transmitted to each one of four UEs: UE A to UE D. In frame 304, respective data is transmitted to each one of nine UEs: UEs A to I. When a larger resource partition is allocated to each UE, as in frame 302, possible benefits include: potentially lower signalling overhead because there are fewer resource partitions to signal to the UEs compared to frame 304; potentially better performance because of a larger forward error correction (FEC) size for a particular UE compared to frame 304; and more time/frequency diversity for a particular UE compared to frame 304. A potential drawback is potentially higher complexity for joint decoding because a larger resource partition may need to be jointly decoded in frame 302 compared to frame 304. For example, in the coordinated multipoint embodiment described later, if a UE is trying to decode data for the UE on tier 2, and frame 302 is a transmission on tier 1, then a whole resource partition in frame 302 may need to be jointly decoded with the tier 2 data. Because the resource partitions in frame 302 are larger than the resource partitions in frame 304, jointly decoding data on tier 2 with a whole resource partition on frame 302 may add complexity compared to jointly decoding the tier 2 with a whole resource partition on frame 304. When a smaller resource partition is allotted to each UE, as in frame 304, possible benefits include: potentially lower complexity for joint decoding because of the smaller resource partition sizes compared to frame 302. Possible drawbacks include: potentially higher signalling overhead compared to frame 302 because of the increased number of resource partitions in frame 304, especially if the location, i.e., boundaries, of the resource partitions change dynamically; and potentially worse performance because of smaller resource partitions in frame 304 compared to frame 302, which means a smaller FEC size. Also, the smaller resource partition sizes means less time/frequency diversity compared to frame 302. In FIG. 6, no UE is allocated two resource partitions. However, in implementation, it may be the case that a UE is scheduled on more than one resource partition.

In some embodiments, a combination of frames 302 and 304 may be used, i.e., both larger and smaller sized resource partitions to try to achieve a trade-off between the possible benefits and drawbacks discussed above.

Figure 7:
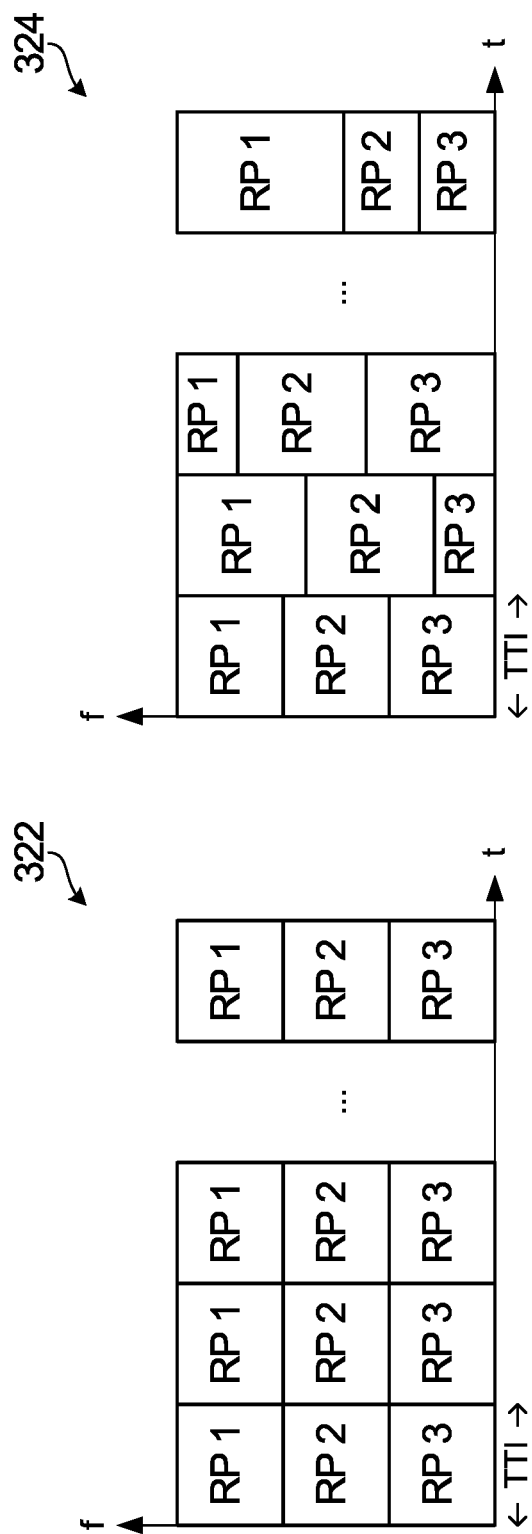

The resources may be partitioned by the joint decoding facilitator 112 either statically, semi-statically, or dynamically. FIG. 7 illustrates two frames 322 and 324 of time-frequency resources, according to one embodiment. A logical partitioning of the resources is illustrated. A static resource partition is illustrated in frame 322. In frame 322, the partition pattern is fixed, and in this particular embodiment for each transmit time interval (TTI) a set of time-frequency resources are partitioned into three resource partitions: RP 1, RP 2, and RP 3. Each UE is scheduled on a respective resource partition. Alternatively, the partition pattern may change semi-statically, i.e., the partition pattern slowly changes over time, such as to slowly adapt to the amount of traffic. In frame 324, the partition pattern is dynamic, that is, changing regularly, such as every TTI. In frame 324, each TTI still has three resource partitions: RP 1, RP 2, and RP 3, but the size of each of these resource partitions changes each TTI. A potential benefit of a static or semi-static resource partition pattern is that signaling overhead may be reduced compared to a dynamic resource partition pattern. For example, if the resource partition pattern of base station 100 is static, then the base station 100 only needs to signal once to the UEs to provide the information indicating how the resources are partitioned because how the resources are partitioned never changes. On the other hand, if the resource partition pattern of base station 100 is dynamic, then every time the resource partitions change, the base station 100 needs to signal to the UEs to provide the information indicating how the next set of resources are partitioned. A potential benefit of a dynamic resource partition pattern is that the resources may be partitioned dynamically to adapt to the amount of traffic.

Different base stations may partition their resources in different ways. For example, frame 322 may be transmitted by base station 100, and frame 324 may be transmitted from base station 200. In some embodiments, a group of base stations may coordinate with each other to partition their resources in the same way, e.g., the same resource partition boundaries may be used for each base station with each base station only independently deciding which UEs will be scheduled on which of their resource partitions. In other embodiments, the base stations may not coordinate with each other at all and partition their resources without regard to how the same resources are partitioned by the other base stations. In some embodiments, there may be partial coordination of resource partition boundaries between base stations. For example, FIG. 8 illustrates coordination between resource partition boundaries by base stations 100 and 200 according to one embodiment. A logical partitioning of the resources is illustrated. A single TTI 342 is illustrated for base station 100, and a corresponding single TTI 344 is illustrated for base station 200. TTI 342 includes four resource partitions, labelled RP 1, RP 2, RP 3, and RP 4. TTI 344 also includes four resource partitions, labelled RP A, RP B, RP C, and RP D. The boundaries of the resource partitions are coordinated such that they are the same. In the FIG. 8 embodiment, the same partition pattern is used for base station 100 and base station 200, and this partition pattern may be static, semi-static, or dynamic. Potential benefits of the FIG. 8 embodiment are: potentially less complex joint decoding for UEs because a single resource partition from base station 100 is coterminous with a corresponding single resource partition from base station 200; and potentially lower overhead for signalling if the partition pattern is static or semi-static because the UEs only need to be informed if the resource partition pattern changes, rather than every TTI. A potential drawback of the FIG. 8 embodiment is that there is less flexibility for a base station to adapt to the base station's traffic because the base station must maintain resource partitions that have boundaries coordinated with that of the other base stations.

FIG. 9 illustrates no coordination between the resource partition boundaries of base stations 100 and 200, according to one embodiment. A logical partitioning of the resources is illustrated. A single TTI 362 is illustrated for base station 100, and a corresponding single TTI 364 is illustrated for base station 200. The boundaries of the resource partitions are not coordinated, such that in general the boundaries are different for each of base station 100 and base station 200. A potential benefit of the FIG. 9 embodiment is that each of base station 100 and base station 200 may adjust the resource partition boundaries according to their own traffic. Possible drawbacks include: potentially more complex for a UE to jointly decode respective data from each of base station 100 and base station 200 because a resource partition of base station 100 is not coordinated to be coterminous with a resource partition of base station 200; and potentially higher overhead because coterminous resource partition sets may need to be identified by a UE performing joint decoding of respective data from base stations 100 and 200. There may also be higher overhead if each base station uses a dynamically changing resource partition pattern because the dynamically changing resource partition pattern would need to be communicated to the UEs. FIG. 10 illustrates some coordination between the resource partition boundaries of base stations 100 and 200, according to one embodiment. FIG. 10 is a compromise between FIG. 8 and FIG. 9. One boundary in TTI 382 is coordinated with a corresponding boundary in TTI 384.

Figure 11:
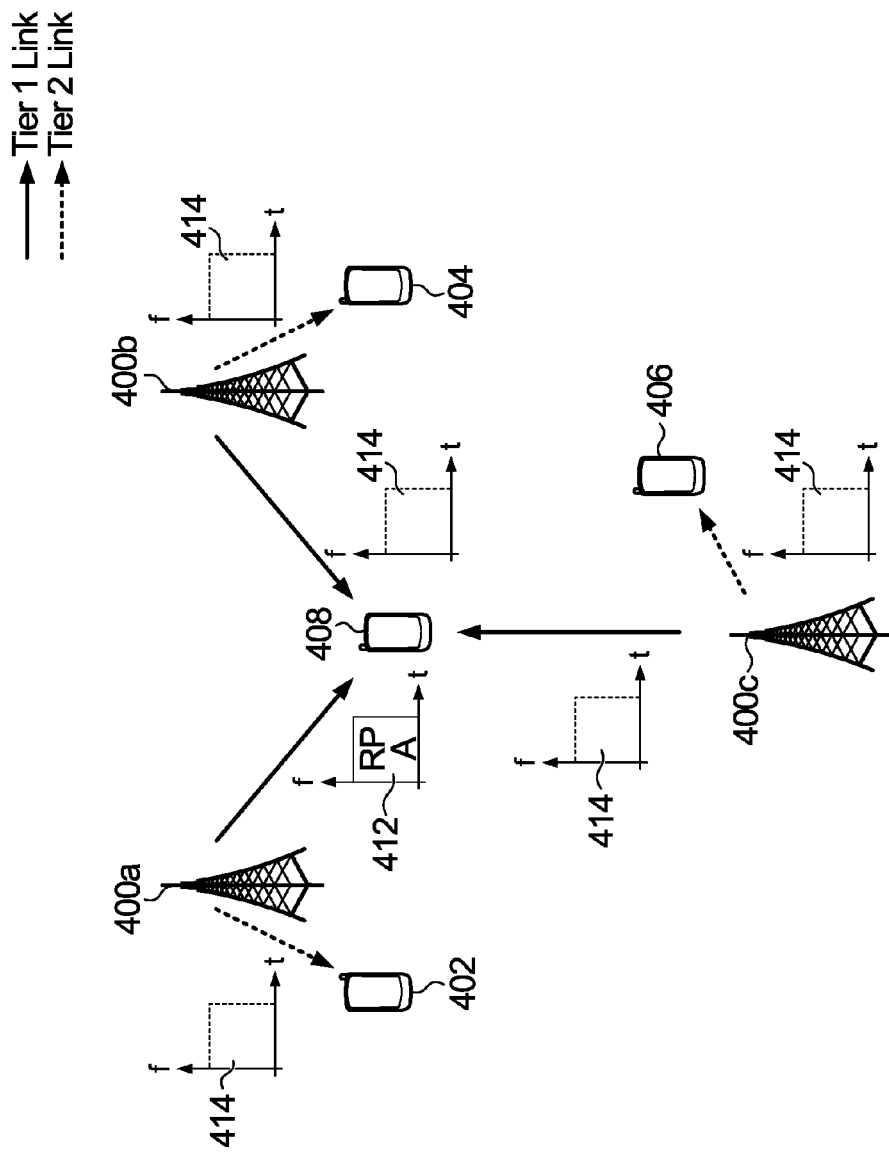
FIG. 11 illustrates a UE-centric multi-user downlink coordinated multipoint system according to one embodiment.

FIG. 11 illustrates a UE-centric multi-user downlink coordinated multipoint (CoMP) system according to one embodiment. UE 402 is only served by base station 400*a*. UE 404 is only served by base station UE 400*b*. UE 406 is only served by base station 400*c*. UE 408 is served by each of base stations 400*a*, 400*b*, and 400*c*. FIG. 11 only illustrates one instance in time. As the UEs 402, 404, 406, and 408 move, they may decide upon which base station or set of base stations will serve them, e.g. based on the quality of the channel between the UE and each base station. Each of base stations 400*a*-*c* transmits on two different tiers, labelled "tier 1" and "tier 2". A tier may alternatively be called a layer. In the example in FIG. 11, UE 408 receives a transmission on tier 1 from each of base stations 400*a*-*c*, UE 402 receives a transmission on tier 2 from base station 400*a*, UE 404 receives a transmission on tier 2 from base station 400*b*, and UE 406 receives a transmission on tier 2 from base station 400*c*. Tier 1 uses the same resources as tier 2. Also, each one of base station 400*a*-*c* uses the same resources as each other one of base stations 400*a*-*c*. Therefore, in general, a downlink transmission to one UE on one tier will be interfered with by the downlink transmission on the other tier, as well as the downlink transmissions from the other tiers of the other base stations in the vicinity of the UE.

Consider an example in which base station 400*a* sends data to UE 408 on tier 1 using a particular resource partition, labelled RP A, and shown at 412. The other downlink transmissions interfere because the same resources are being used on each tier by each of base stations 400*a*-*c*, as shown at 414. This interference may be mitigated by performing joint decoding. For example, the UE 408 may jointly decode the tier 1 data from each of base stations 400*a*-*c*. As discussed above, joint decoding may be more effective if the UE 408 has the information indicating how resources are partitioned by each of base stations 400*a* to 400*c* into a respective plurality of resource partitions, i.e. the resource partition pattern for each base station. Therefore, in this embodiment, the resource partition boundaries for tier 1 are communicated to the UEs, including UE 408.

Tier 1 may be called the "fixed tier" because in this embodiment the MCS of the data transmitted on tier 1 is static or changes only semi-statically. Tier 2 may be called the "non-fixed tier" because in this embodiment the MCS of the data transmitted on tier 2 adapts for each UE based on the channel quality between the base station and the UE. Some UEs, such as UE 402, 404 and 406, may be scheduled on tier 2, and other UEs, such as UE 408, may be scheduled on tier 1. Transmissions on tier 1 may be designed to better serve UEs at the edge of coverage range of a base station, e.g. by having more power and/or a fixed lower MCS compared to tier 2 transmissions. In the FIG. 11 embodiment, only the resource partition pattern for tier 1 for each base station is communicated to each UE in the vicinity of each base station. Examples of such resource partitions patterns are illustrated above in relation to FIGS. 6 to 10. There is no predetermined resource partition pattern in tier 2 that is communicated to the UEs.

In operation, UE 402 is served by tier 2 of base station 400*a*, and so UE 402 uses knowledge of the resource partition patterns on tier 1 of base station 400*a* to 400*c* to jointly decode the data on tier 1 as much as possible and thereby reduce interference when decoding the data on tier 2 intended for UE 402. UEs 404 and 406 operate in a similar way. UE 408 uses knowledge of the resource partition patterns on tier 1 of each of base stations 400*a* to 400*c* to jointly decode the data on tier 1 and obtain the data meant for UE 408 that was transmitted on RP A. The tier 2 transmissions act as noise to UE 408.

In some embodiments, the way in which coded bits are mapped to resources of each resource partition of the tier 1 transmissions may be transmitted to the UEs 402 to 408. The rate mapping information, such as the RV, is an example of an indication of the way in which coded bits are mapped to resources. The UEs 402 to 408 may each receive at least one message from each base station 400*a*-*c* indicating how the coded bits are mapped to the resources for that base station on tier 1. In some embodiments, the way in which coded bits are mapped to resources of each resource partition of the tier 1 transmissions may fixed in advance, i.e. the same for all resource partitions of the tier 1 transmission for a base station. For example, in an LTE implementation, the RV may be fixed at RV 0 for tier 1 transmissions, and this may be communicated to the UEs 402 to 408. RV 0 is then always used for any transmission on the tier 1, even if the transmission on tier 1 is HARQ retransmission data. In other embodiments, a predetermined RV number may be chosen from a sequence, such that the RV varies but in a way known in advance by the UEs 402 to 408.

In some embodiments, the HARQ process ID associated with retransmission data sent on tier 1, or any other information used to identify the HARQ retransmission, may be transmitted from a base station to only the target UE that requested the retransmission, e.g. via unicast signaling. In these embodiments, only the target UE performs HARQ combining, and any other UEs performing joint decoding of tier 1 data including the retransmission data treat the retransmission data as if the retransmission data is an initial transmission of the data, not a retransmission. Signalling the HARQ process ID to only the target UE may reduce overhead compared to having to signal the HARQ process ID to other UEs also, but the performance of the joint decoding for the other UEs may be reduced because the other UEs do not know that the retransmission data is a retransmission corresponding to an earlier initial transmission, and therefore the other UEs cannot perform the HARQ combining. The way in which coded bits are mapped to resources, e.g. the RV, for the retransmission data may be fixed, which would be the case if the RV is fixed for tier 1. The RV would then not have to be signalled to the UEs, except possibly once for each UE when the UE entered the coverage area of the base station. In an alternative embodiment, the RV is not fixed and the RV for the resource partitions on tier 1 may be signalled to all UEs whenever the RV changes, even though the HARQ process ID is only signalled to the target UE.

In other embodiments, the HARQ process ID associated with retransmission data sent on tier 1, or any other information used to identify the HARQ retransmission, may be broadcast to all UEs served by the base station 100. In these embodiments, not only does the target UE perform HARQ combining, but also any other UEs performing joint decoding of data on tier 1 including the retransmission data may perform the HARQ combining to possibly improve the joint decoding. Signalling the HARQ process ID to some or all of the other UEs besides the target UE may increase overhead compared to having to signal the HARQ process ID only to the target UE, but the performance of the joint decoding may be enhanced because the other UEs know that the retransmission data is a retransmission corresponding to an earlier initial transmission, and therefore the other UEs may perform the HARQ combining as part of their joint decoding. As above, the way in which coded bits are mapped to resources, e.g. the RV, for the retransmission data may be fixed, which would be the case if the RV is fixed for tier 1. Otherwise the RV for the resource partitions on tier 1 may additionally be broadcast to the UEs.

In some embodiments, the initial transmission of the data from each base station 400*a-c* may be on tier 1, and all HARQ retransmissions occur only on tier 2. In these embodiments, the HARQ process ID does not have to be signalled for joint decoding of data on tier 1 transmissions because all data jointly decoded by UEs on tier 1 is initial transmission data. Additionally, if the RV of tier 1 is always fixed, e.g. at RV 0, and this is communicated once to all UEs, then subsequently the RV also does not have to be transmitted to the UEs for jointly decoding tier 1 data.

In some embodiments, if an initial transmission occurs on tier 1, then any of the retransmissions of the data also occur on tier 1. In some embodiments, if an initial transmission of the data occurs on tier 2, then any retransmissions of the data also occur on tier 2.

In some embodiments, the way in which the coded bits are mapped to resources may not be fixed for the tier 1 transmissions, in which case additional signaling is required to communicate to the UEs the way in which the coded bits are mapped to resources. In an LTE implementation, the way in which the coded bits are mapped to resources may consist of the rate mapping information, such as the RV. If the RV is not fixed for tier 1, then additional signaling is required to communicate to the UEs the RV for each resource partition of the plurality of resource partitions.

In one embodiment, base station 400*a* sends retransmission data in a tier 1 transmission in response to a HARQ retransmission request from a particular target UE. The information used to identify the HARQ retransmission, e.g. the HARQ process ID, for the retransmission is broadcast to all UEs in the vicinity of the base station 400*a*. The RV is not fixed for tier 1 of base station 400*a*, and so the base station 400*a* also broadcasts the RV of the retransmission data. If the RV was fixed for tier 1, then the UEs would have previous knowledge of the RV when it was originally sent to the UEs. The target UE performs HARQ combining to decode the unsuccessfully decoded initial data. The other UEs performing joint decoding of data that includes the retransmission data use the RV and the HARQ process ID to also perform HARQ combining to increase the performance of the joint decoding. Higher overhead results from broadcasting the HARQ process ID and the RV, but higher performance joint decoding may be possible.

In general, when base station 400*a* partitions the resources used for downlink transmissions on tier 1 into a plurality of resource partitions, the more resource partitions there are, the higher the signaling overhead may be because the HARQ process ID and RV associated with each resource partition is to be transmitted from the base station 400*a* to one, some, or all of the UEs in the vicinity of the base station 400*a*. However, as discussed above, there may be embodiments in which the RV is fixed for all data transmitted on tier 1 and/or no retransmissions are made on tier 1, such that less signaling overhead may be required.

UEs 402 to 408 may provide feedback to base stations 400*a-c*. For example, when UE 408 enters the vicinity of base stations 400*a-c*, UE 408 may determine whether or how well UE 408 can jointly decode data on each resource partition in tier 1, and then send a decodability index to each of the base stations 400*a-c* indicating which ones of the resource partitions can be decoded by UE 408 and/or indicating how likely each resource partition can be decoded by UE 408. If a particular area of resources in tier 1 only has one resource partition, then only one decodability index may need to be transmitted for the area, and this decodability index may be referred to as a "wideband CQI". Alternatively, if there are multiple resource partitions, then a decodability index may need to transmitted for each resource partition, and each decodability index may be referred to as a "subband CQI".

FIGS. 12 to 15 each illustrate an example of a tier 1 transmission of base station 400*a*, a tier 1 transmission of base station 400*b*, and a tier 2 transmission of base station 400*c*. The tier 1 transmission from base station 400*a* uses SCMA with two codebooks, i.e. two SCMA layers. The tier 1 transmission from base station 400*b* also uses SCMA with two SCMA layers. The tier 2 transmission from base station 400*c* uses OFDMA.

In FIG. 12, a UE scheduled on RP 1 jointly decodes the data on RP 1 from base station 400*a* and the data on RP A from base station 400*b* because these resource partitions are coterminous. Another UE scheduled on RP I jointly decodes as many SCMA resource partitions from tier 1 as possible to reduce interference before decoding the data on RP I. In this example, the UE scheduled on RP I jointly decodes the respective data sent on RPs 1, 2, A, and B because RP I overlaps with resources in RPs 1, 2, A, and B.

In FIG. 13, a UE scheduled on RP 1 jointly decodes the data on RP 1, RP 5, RP A and RP E. Another UE scheduled on RP I jointly decodes as many SCMA resource partitions from tier 1 as possible to reduce interference before decoding the data on RP I. In this example, the UE scheduled on RP I jointly decodes the respective data sent on RPs 1, 2, 5, 6, A, B, E, and F because RP I overlaps with resources in RPs 1, 2, 5, 6, A, B, E, and F.

Figure 14:
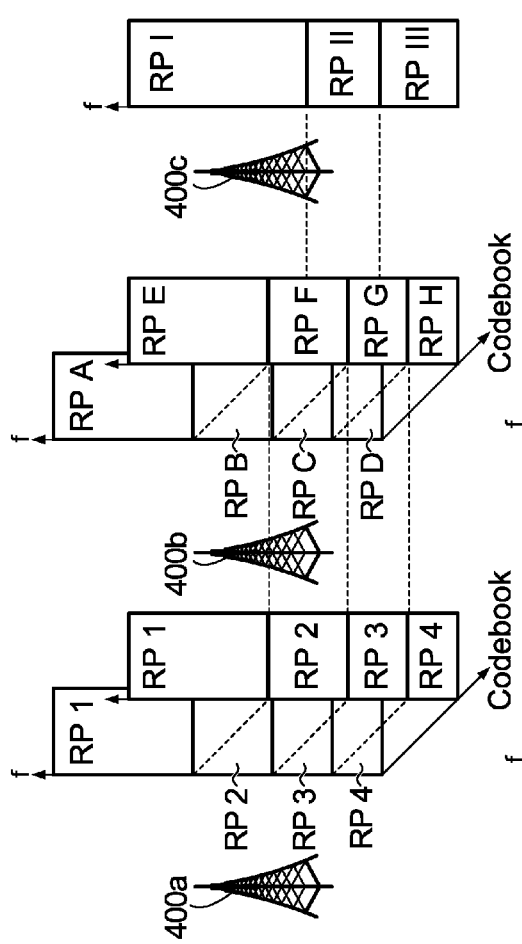

In FIG. 14, each resource partition of the tier 1 transmission from base station 400a uses two SCMA layers, and each resource partition of the tier 1 transmission from base station 400b uses one SCMA layer. A UE scheduled on RP 1 jointly decodes the data on RPs 1, A, and E because RP 1 is coterminous with the resource partition set having RPs A and E. Another UE scheduled on RP I jointly decodes as many SCMA resource partitions from tier 1 as possible to reduce interference before decoding the data on RP I. In this example, the UE scheduled on RP I jointly decodes the respective data sent on RPs 1, 2, A, B, E, and F because RP I overlaps with resources in RPs 1, 2, A, B, E, and F.

Figure 15:
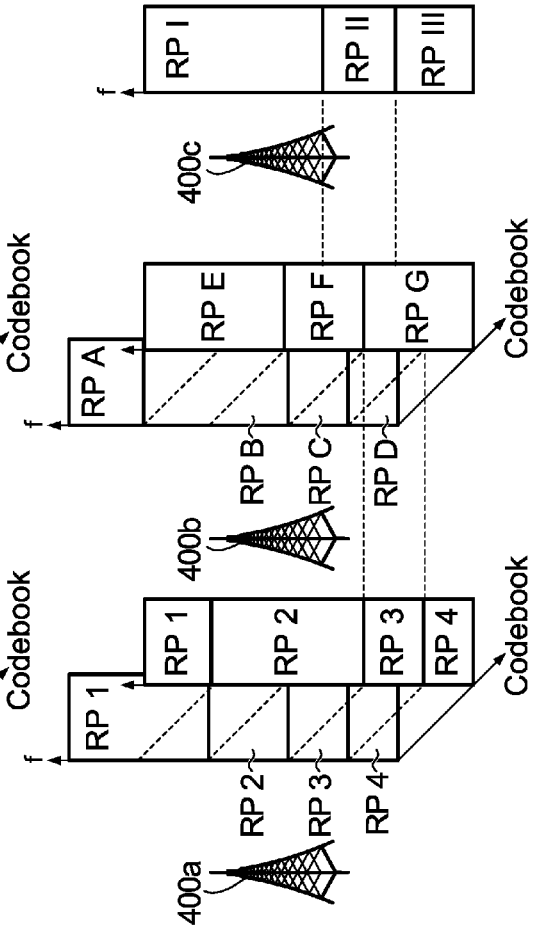

In FIG. 15, RPs 1 and 2 in the first SCMA layer of base station 400a form a resource partition set that is coterminous with a resource partition set in the second SCMA layer having RPs 1 and 2. Similarly, RPs A and B in the first SCMA layer of base station 400b form a resource partition set that is coterminous with a resource partition set in the second SCMA layer having RPs E and F. The resource partition set having RPs 1 and 2 is coterminous with the resource partition set having RPs A, B, E, and F. The resource partition set having RPs 3 and 4 is coterminous with the resource partition set having RPs C, D, and G. A UE scheduled on any of RPs 1, 2, A, B, E, or F of the SCMA layer jointly decodes the respective data on RPs 1, 2, A, B, E, and F. A UE scheduled on any of RPs 3, 4, C, D, or G of the SCMA layer jointly decodes respective data on RPs 3, 4, C, D, and G. A UE scheduled on RP I of the OFDMA layer jointly decodes respective data on RPs 1, 2, A, B, E, and F before jointly decoding RP I.

Figure 16:
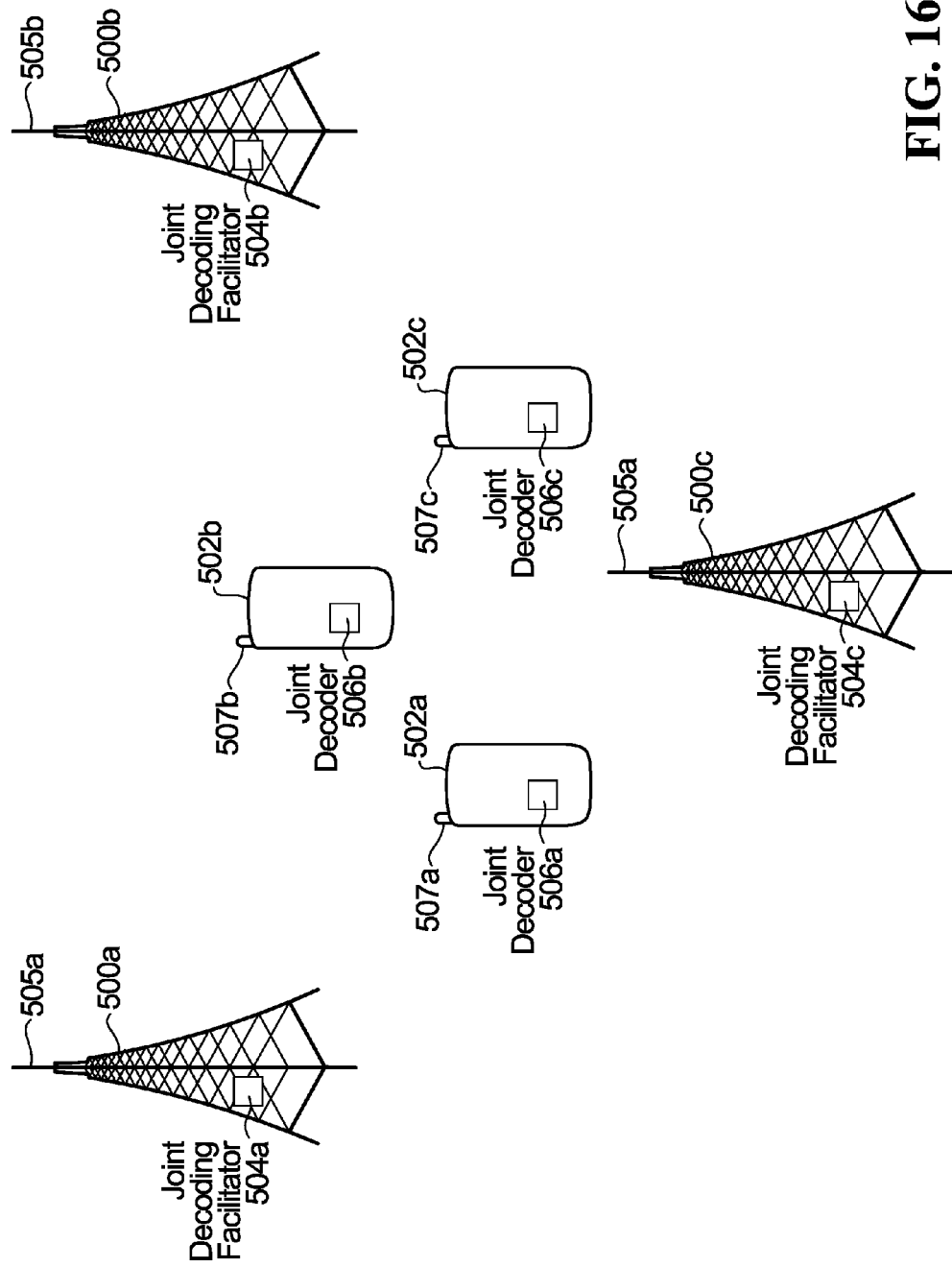
FIG. 16 illustrates a plurality of base stations and a plurality of UEs according to one embodiment.

The foregoing describes specific examples. More generally, FIG. 16 illustrates a plurality of base stations and a plurality of UEs according to one embodiment. Three base stations are illustrated: base station 500a, base station 500b, and base station 500c. Base station 500a includes a joint decoding facilitator 504a and at least one antenna 505a. The joint decoding facilitator 504a may be implemented by a processor (not shown) that executes instructions that cause the processor to perform the operations of the joint decoding facilitator 504a. Alternatively, the joint decoding facilitator 504a may be implemented using dedicated integrated circuitry, such as an ASIC, a GPU, or a FPGA for performing the operations of the joint decoding facilitator 504a. Base stations 500b and 500c include respective joint decoding facilitators 504b and 504c, which have the same structure and operate in the same manner as joint decoding facilitator 504a. Base station 500b has at least one antenna 505b, and base station 500c also has at least one antenna 505c.

Three UEs are illustrated in FIG. 16: UE 502a, UE 502b, and UE 502c. UE 502a includes a joint decoder 506a, which performs joint decoding of data in the manner described herein. The joint decoder 506a may be implemented by a processor (not shown) that executes instructions that cause the processor to perform joint decoding. Alternatively, the joint decoder 506a may be implemented using dedicated integrated circuitry, such as an ASIC, a GPU, or a FPGA for performing the joint decoding. Examples of joint decoding that may be performed by the joint decoder 506a include successive interference cancellation (SIC), joint maximum likelihood decoding (MLD), and the message passing algorithm (MPA). UE 502a also has at least one antenna 507a. UEs 502b and 502c include respective joint decoding facilitators 506b and 506c, which have the same structure and operate in the same manner as joint decoding facilitator 504a. UE 502b also includes at least one antenna 507b, and UE 502c also includes at least one antenna 507c.

Figure 17:
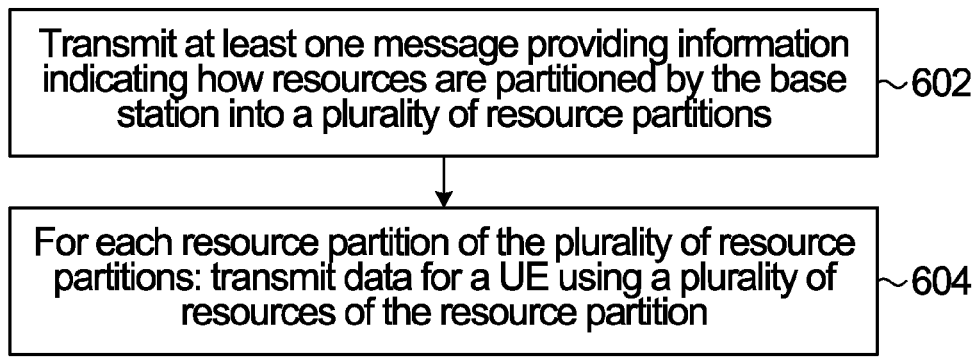
FIG. 17 is a flowchart of a method performed by a base station according to one embodiment.

FIG. 17 is a flowchart of a method performed by base station 500a according to one embodiment. In step 602, the base station 500a transmits at least one message for at least one of UEs 502a-c that is to jointly decode respective data in each of at least two downlink transmissions. The at least one message provides information indicating how resources are partitioned by the base station 500a into a plurality of resource partitions. The message may be generated by the joint decoding facilitator 504a. To generate the message, the joint decoding facilitator 504a decides how the resources are to be partitioned and then includes this indication in a message. The joint decoding facilitator 504a may decide how to partition the resources based on one or more of the following: (1) Traffic: If there are many UEs with short packets, then the joint decoding facilitator 504a may partition the resources into many partitions of a small size; (2) UE priority or Quality of Service (QoS): If there are some UEs that have higher priority and have a large volume of traffic, then the joint decoding facilitator 504a may set aside a large resource partition to be used for a transmission to a high priority UE; (3) Performance: The larger the FEC size, the better the performance, and so the joint decoding facilitator 504a may partition resources into some larger partitions to accommodate larger FEC size. If how the resources are partitioned changes over time, then the joint decoding facilitator may indicate when the change is to occur and put this indication in the message. The joint decoding facilitator may communicate with base stations 500b and 500c to decide upon resource partitions or resource partition sets that are coterminous with corresponding resource partitions or resource partition sets of the base stations 500b and 500c.

In step 604, for each resource partition of the plurality of resource partitions: the base station 500a transmits data for a UE using a plurality of resources of the resource partition. For example, in frame 302 of FIG. 6 there are four resource partitions, each one assigned to one of four UEs: UE A to UE D. The resources in the resource partition assigned to UE A are used to transmit data from the base station 500a to UE A, the resources in the resource partition assigned to UE B are used to transmit data from the base station 500a to UE B, and so on. To actually make the data transmission from the base station 500a, the downlink physical layer of the base station 500a is used, e.g. the downlink physical layer illustrated and described in relation to FIG. 1. In some embodiments, how the resources are partitioned by the base station 500a into the plurality of resource partitions changes over time, either semi-statically or dynamically, and the method may include transmitting at least one subsequent message indicating how subsequent resources are partitioned by the base station 500a into a subsequent respective plurality of resource partitions. In other embodiments, how the resources are partitioned does not change over time. In such embodiments, the at least one message may be transmitted once to a particular UE when the particular UE enters into a coverage area of the base station 500a. In some embodiments, a resource partition set including at least one of the resource partitions is coterminous with a resource partition set of another base station, e.g. as in FIGS. 4 and 5. In some embodiments, each resource partition set may only have one resource partition, e.g. as in FIG. 3. In some embodiments, a first tier is used to transmit data using the plurality of resource partitions, and the method may include: when using resources in at least one resource partition to transmit data in the first tier, also using the same resources in the at least one resource partition to transmit other data in a second tier. Examples are described above in relation to the system in FIG. 11. In some embodiments, the method further includes transmitting an indication of how coded bits are mapped to the resources of the resource partitions. The indication of how coded bits are mapped to the resources of the resource partitions may be an indication of rate mapping information, such as an RV used for the coded bits for each resource partition. In some embodiments, the RV is the same for each resource partition.

The data transmitted in each resource partition has an MCS. In some embodiments, the MCS associated with each resource partition is transmitted as part of the at least one message in step 602. In some embodiments, the MCS associated with each resource partition is the same, e.g. for tier 1. In some embodiments, the method further comprises transmitting an initial transmission on the first tier and transmitting any retransmission associated with the initial transmission on the second tier. In some embodiments, for a duration of time during which the MCS associated with each resource partition does not change, the method may further include the following feature: when using resources in at least one resource partition to transmit data having the MCS, also using the same resources in the at least one resource partition to transmit other data having another MCS that changes over the duration of time. In some embodiments, the method may further include scheduling at least one UE on the resources in the at least one resource partition; and scheduling at least one other UE on the same resources in the at least one resource partition that are used to transmit the other data. For example, UE 502*b* may be scheduled on the resources in the at least one resource partition, and UE 502*a* may be scheduled on the same resources in the at least one resource partition that are used to transmit the other data. The other data in this case may be for UE 502*a*. In some embodiments, an indication of a HARQ retransmission sent on the first tier for a particular UE is broadcast. In some embodiments, the method may further include transmitting particular data to UE 502*a* using resources of a particular resource partition; receiving a message from the UE 502*a* indicating that a HARQ retransmission of the particular data is required; transmitting the HARQ retransmission as part of the other data, e.g. on tier 2. In some embodiments, the method further comprises transmitting to UE 502*a* and possibly UE 502*b* an indication of which of the resources are used for a HARQ retransmission for the UE 502*a*.

In some embodiments, in the case when the resource partitions change on a semi-static or dynamic basis, a message may be sent to the UEs indicating the new resource partition boundaries. In these embodiments, the method may further include transmitting at least one message providing an indication of how a second set of resources is partitioned into different resource partitions. In some embodiments, the MCS associated with each of the different resource partitions is the same as the MCS associated with each resource partition of the first set of resources. The method may further include transmitting, using the second set of resources, additional data having the MCS. In some embodiments, the method may further comprise receiving at least one message from a UE 502*a* indicating which ones of the resource partitions can be decoded by UE 502*a* and/or indicating how likely each resource partition can be decoded by UE 502*a*. In some embodiments, the method may further include transmitting data to UE 502*a* using at least one of the resource partitions that can be decoded by UE 502*a*.

Figure 18:
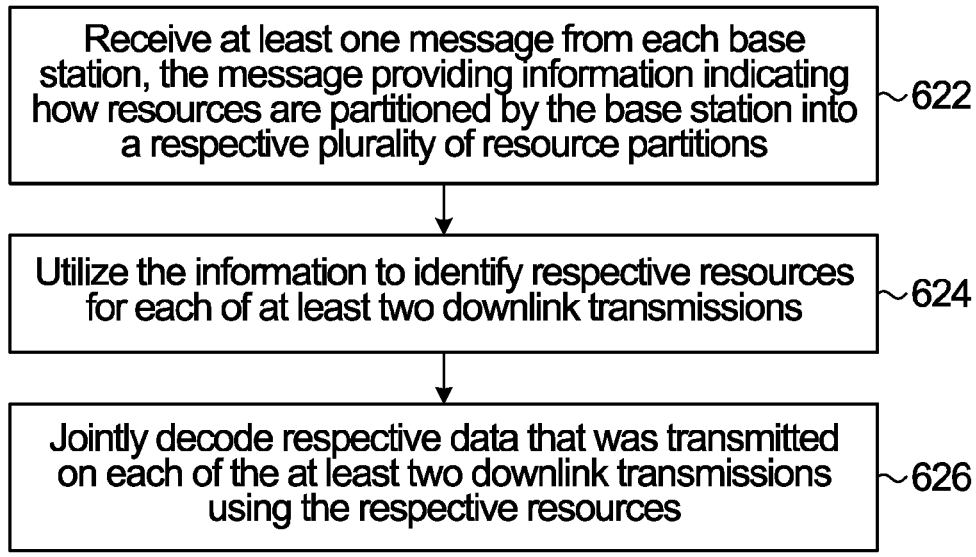
FIG. 18 is a flowchart of a method performed by a UE according to one embodiment.

FIG. 18 is a flowchart of a method performed by UE 502*a* according to one embodiment. In step 622, the UE 502*a* receives at least one message from each base station of at least one of the base stations 500*a-c*. The message from each base station provides information indicating how resources are partitioned by the base station into a respective plurality of resource partitions. In step 624, the UE 502*a* utilizes the information to identify respective resources for each of at least two downlink transmissions. The at least two downlink transmissions may be from different base stations or the same base station. As one example, there may be three downlink transmissions, each from a respective one of base stations 500*a-c*. In step 626, the UE 502*a* jointly decodes respective data that was transmitted on each of the at least two downlink transmissions using the respective resources, to obtain jointly decoded data. The joint decoding is performed by the joint decoder 506*a*. For example, the joint decoder 506*a* may perform SIC, MLD, or MPA.

In some embodiments, each of the downlink transmissions is from a respective base station of a plurality of base stations, and the identified respective resources are coterminous. In some embodiments, for each base station of the plurality of base stations, the respective resources comprise a respective resource partition set including at least one resource partition of the respective plurality of resource partitions. In some embodiments, the respective data from each of the plurality of base stations is transmitted on a first tier, and other data from a particular base station of the plurality of base stations is transmitted on a second tier using the same resources as the respective resources of the particular base station. In some embodiments, the method comprises receiving an initial transmission from a particular base station on the first tier and receiving any retransmission associated with the initial transmission on the second tier. In some embodiments, the at least one message from each base station further indicates how coded bits are mapped by the base station to resources of each resource partition of the respective plurality of resource partitions. In some embodiments, the indication is rate mapping information, such as a RV. In some embodiments, for each of the base stations 500*a-c*, the RV associated with each resource partition of the respective plurality of resource partitions is the same for each resource partition of the respective plurality of resource partitions.

In some embodiments, the method may further include receiving from one base station an indication of a HARQ retransmission sent on the first tier for another UE, e.g. a HARQ process ID for the HARQ retransmission may be received; and jointly decoding data for the other UE and additional data on the first tier by using the HARQ retransmission sent for the other UE. In some embodiments, how the resources are partitioned by a particular base station into the respective plurality of resource partitions changes over time, and the method further comprises receiving at least one subsequent message from the particular base station indicating how subsequent resources are partitioned by the particular base station into a subsequent respective plurality of resource partitions. In other embodiments, how the resources are partitioned by the particular base station into the respective plurality of resource partitions does not change over time, and the at least one message from the particular base station may be received by the UE 502*a* when the UE 502*a* enters into a coverage area of the particular base station. In some embodiments, how the resources are partitioned by each base station into a respective plurality of resource partitions is the same for each base station. Each resource partition may be coterminous with a respective resource partition of another base station.

As one example, in step 622, a respective message may be received by the UE 502*a* from each of base stations 500*a* and 500*b*. The message from base station 500*a* indicates how the resources are partitioned by base station 500*a* into a plurality of resource partitions. The message from base station 500*b* indicates how the resources are partitioned by base station 500*b* into a plurality of resource partitions. In step 624, in this example, the UE 502*a* utilizes this information to identify respective resources in a downlink transmission from base station 500*a* and a downlink transmission from base station 500*b*. For example, the downlink transmission from base station 500*a* may be frame 164 in FIG. 3 and the downlink transmission from base station 500*b* may be frame 264 in FIG. 3, and the respective resources identified by the UE 502*a* are resource partitions 162 and 262 in FIG. 3. In step 626, the UE 502*a* jointly decodes the respective data that was transmitted on each of the at least two downlink transmissions using the respective resources, to obtain jointly decoded data. With reference to the example of FIG. 3, the UE 502*a* jointly decodes the respective data that was transmitted in resource partitions 162 and 262.

In some embodiments, the at least one message received from each base station also indicates an MCS associated with each resource partition of the resource partitions of the base station. In some embodiments, utilizing the information to identify respective resources comprises: identifying a single resource partition of one of the base stations that is coterminous with a corresponding single resource partition of each of the other base stations, e.g., as in the FIG. 3 example. In the FIG. 3 example, the resource partitions from each of the base stations are coterminous, and a single resource partition from one of the downlink transmissions is jointly decoded with a single coterminous resource partition from the other downlink transmission.

In some embodiments, the RV is the same for each resource partition of the plurality of resource partitions used by the base station. In some embodiments, for each of the base stations 500*a-c*, the MCS associated with each resource partition of the respective plurality of resource partitions is the same. In some embodiments, the UE 502*a* utilizes the jointly decoded data to decode other data, different from the jointly decoded data, that was sent, using the same resources, from a particular base station of the base stations 500*a-c*. For example, data on a first tier may be jointly decoded and then used to decode other data on a second tier. The jointly decoded data may be used to reduce interference. In some embodiments, for a duration of time during which the MCS associated with each of the resource partitions of the base station 500*a* does not change, other data may be received on the same resources, e.g. on the second tier, and this other data has a MCS that changes. In some embodiments, this other data may include a HARQ retransmission corresponding to data obtained with errors from previous jointly decoded data sent on the first tier. In some embodiments, the method may further comprise: obtaining particular data for the UE 502*a* from the jointly decoded data; determining that a HARQ retransmission is required for the particular data; sending a message requesting the HARQ retransmission; jointly decoding data received from at least one of base station in a subsequent downlink transmission to obtain subsequent jointly decoded data; and utilizing the subsequent jointly decoded data to obtain subsequent data having the HARQ retransmission. In some embodiments, the method may further include receiving from a particular base station an indication of a HARQ retransmission sent for UE 502*a* and/or another UE. The indication may be a HARQ process ID. In some embodiments, the method may further include jointly decoding data for another UE and other data by using the HARQ retransmission sent for the another UE.

In some embodiments, the resources may be partitioned by base station 500*a* in a static, semi-static, or a dynamic manner. If the partitioning is performed by the base station 500*a* in a static manner, then the UE 502*a* may only receive a single indication of what the resource partition boundaries will be, and that never changes. If the resource partitions are changed in a semi-static or dynamic manner, then every time a change to the boundaries of the resource partitions are made, then this may be signalled to the UE 502*a*. In embodiments in which the partitioning is performed by the base station 500*a* in a semi-static or dynamic manner, then the method of FIG. 18 may further include receiving at least one subsequent message from each of the base stations. The at least one subsequent message from each base station provides information indicating how different resources are partitioned by the base station into a respective plurality of different resource partitions. The UE 502*a* may utilize the information to identify respective subsequent resources, for at least two subsequent downlink transmissions. The UE 502*a* may jointly decode subsequent respective data that was transmitted on each of the at least two subsequent downlink transmissions using the subsequent respective resources, to obtain subsequent jointly decoded data. In some embodiments, the method further includes receiving at least one signal carrying respective data from one base station and respective data from another base station. The respective data from the one base station includes data for the UE, and the respective data from the another base station includes other data. The UE obtains the data for the UE by performing the joint decoding. In some embodiments, each resource partition of the plurality of respective resource partitions consists of a respective plurality of OFDM subcarriers.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a user equipment (UE), the method comprising:
    receiving at least one message from each base station of at least one base station, the at least one message from each base station providing information indicating how resources are partitioned by the base station into a respective plurality of resource partitions;
    determining a first set of the resources on which a first downlink transmission is received and a second set of the resources on which a second downlink transmission is received based on the information, wherein the first set of the resources and the second set of the resources are coterminous, and wherein the first downlink transmission carries different data from the second downlink transmission;
    jointly decoding at least the first downlink transmission and the second downlink transmission to obtain jointly decoded data.

2. The method of claim 1, wherein the first set of the resources and the second set of the resources each include only one resource partition.

3. The method of claim 1, wherein at least one of the first set of the resources and the second set of the resources includes more than one resource partition.

4. The method of claim 1, wherein the first downlink transmission and the second downlink transmission are received on a first tier, and wherein other data from a particular base station is transmitted on a second tier using the first set of the resources.

5. The method of claim 4, wherein the at least one message from each base station further indicates how coded bits are mapped by the base station to resources of each resource partition of the respective plurality of resource partitions.

6. The method of claim 5, wherein the indication of how the coded bits are mapped by the base station comprises an indication of a redundancy version (RV) used for the coded bits, and wherein for each base station, the RV associated with each resource partition of the respective plurality of resource partitions is the same for each resource partition of the respective plurality of resource partitions.

7. The method of claim 4, further comprising:
    receiving from one base station an indication of a HARQ retransmission sent on the first tier for another UE; and
    jointly decoding data for the another UE and additional data on the first tier by using the HARQ retransmission sent for the another UE.

8. The method of claim 1, wherein the receiving at least one message from each base station comprises: receiving at least one first message that provides first information indicating how the resources are partitioned into a first plurality of resource partitions and receiving at least one second message that provides second information indicating how the resources are partitioned into a second plurality of resource partitions; and wherein the first information and the second information are utilized to determine the first set of resources and the second set of resources.

9. A user equipment (UE) comprising:
    at least one antenna configured to receive at least one message from each base station of at least one base station, the at least one message from each base station providing information indicating how resources are partitioned by the base station into a respective plurality of resource partitions;
    a joint decoder configured to obtain jointly decoded data by:
        determining a first set of the resources on which a first downlink transmission is received and a second set of the resources on which a second downlink transmission is received based on the information, wherein the first set of the resources and the second set of the resources are coterminous, and wherein the first downlink transmission carries different data from the second downlink transmission; and
        jointly decoding at least the first downlink transmission and the second downlink transmission.

10. The UE of claim 9, wherein the first set of the resources and the second set of the resources each include only one resource partition.

11. The UE of claim 9, wherein at least one of the first set of the resources and the second set of the resources includes more than one resource partition.

12. The UE of claim 9, configured to receive: the first transmission and the second transmission on a first tier; and other data from a particular base station transmitted on a second tier using the first set of the resources.

13. The UE of claim 12, wherein the at least one message from each base station further indicates how coded bits are mapped by the base station to resources of each resource partition of the respective plurality of resource partitions.

14. The UE of claim 12, wherein the UE is further configured to:
    receive from one base station an indication of a HARQ retransmission sent on the first tier for another UE; and
    jointly decode data for the another UE and additional data on the first tier by using the HARQ retransmission sent for the another UE.

15. The UE of claim 9, wherein the at least one message comprises: at least one first message that provides first information indicating how the resources are partitioned into a first plurality of resource partitions and at least one second message that provides second information indicating how the resources are partitioned into a second plurality of resource partitions; and wherein the joint decoder is configured to utilize the first information and the second information to determine the first set of resources and the second set of resources.

16. A method performed at a base station, the method comprising:
- transmitting at least one message to a user equipment (UE), the at least one message providing information indicating how resources are partitioned by the base station into a respective plurality of resource partitions;
- transmitting a first downlink transmission on a first set of the resources, and transmitting a second downlink transmission on a second set of the resources, wherein the first set of the resources and the second set of the resources are coterminous, and wherein the first downlink transmission carries different data from the second downlink transmission;
- wherein the UE is to utilize the information to identify the first set of the resources and the second set of the resources, and the UE is to jointly decode at least the first downlink transmission on the first set of the resources and the second downlink transmission on the second set of the resources.

17. The method of claim 16, wherein the first set of the resources and the second set of the resources each include only one resource partition.

18. The method of claim 16, wherein at least one of the first set of the resources and the second set of the resources includes more than one resource partition.

19. The method of claim 16, wherein how the resources are partitioned changes over time, the method further comprising: transmitting at least one subsequent message indicating how subsequent resources are partitioned into a subsequent respective plurality of resource partitions.

20. The method of claim 16, wherein how the resources are partitioned does not change over time, and the at least one message is transmitted to the UE when the UE enters into a coverage area of the base station.

21. The method of claim 16, wherein the first downlink transmission is sent on one tier, and the second downlink transmission is sent on another tier.

22. The method of claim 16, further comprising transmitting an indication of how coded bits are mapped to the resources.

23. The method of claim 16, wherein the at least one message comprises: at least one first message that provides first information indicating how the resources are partitioned into a first plurality of resource partitions and at least one second message that provides second information indicating how the resources are partitioned into a second plurality of resource partitions; and wherein the UE is to utilize the first information and the second information to identify the first set of the resources and the second set of the resources.

24. A base station comprising:
- a joint decoding facilitator configured to generate at least one message providing information indicating how resources are partitioned by the base station into a respective plurality of resource partitions;
- at least one antenna to:
  - transmit the at least one message;
  - transmit a first downlink transmission on a first set of the resources; and
  - transmit a second downlink transmission on a second set of the resources;
- wherein the first set of the resources and the second set of the resources are coterminous, and wherein the first downlink transmission carries different data from the second downlink transmission;
- wherein the UE is to utilize the information to identify the first set of the resources and the second set of the resources, and the UE is to jointly decode at least the first downlink transmission on the first set of the resources and the second downlink transmission on the second set of the resources.

25. The base station of claim 24, wherein the first set of the resources and the second set of the resources each include only one resource partition.

26. The base station of claim 24, wherein at least one of the first set of the resources and the second set of the resources includes more than one resource partition.

27. The base station of claim 24, wherein how the resources are partitioned changes over time, and the joint decoding facilitator is further configured to generate at least one subsequent message for transmission, the at least one subsequent message indicating how subsequent resources are partitioned into a subsequent respective plurality of resource partitions.

28. The base station of claim 24, wherein how the resources are partitioned does not change over time, and the base station is configured to transmit the at least one message to the UE when the UE enters into a coverage area of the base station.

29. The base station of claim 24, wherein e base station is configured to transmit an indication of how coded bits are mapped to the resources.

30. The base station of claim 24, wherein the at least one message comprises: at least one first message that provides first information indicating how the resources are partitioned into a first plurality of resource partitions and at least one second message that provides second information indicating how the resources are partitioned into a second plurality of resource partitions; and wherein the UE is to utilize the first information and the second information to identify the first set of the resources and the second set of the resources.

* * * * *